United States Patent
Siy

(10) Patent No.: US 11,321,927 B1
(45) Date of Patent: May 3, 2022

(54) TEMPORAL SEGMENTATION

(71) Applicant: Apple Inc., Cupertino, CA (US)

(72) Inventor: Ronald Vernon Ong Siy, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 10 days.

(21) Appl. No.: 16/985,065

(22) Filed: Aug. 4, 2020

Related U.S. Application Data

(60) Provisional application No. 62/904,452, filed on Sep. 23, 2019.

(51) Int. Cl.
| | | |
|---|---|---|
| *G06T 19/00* | (2011.01) | |
| *G06F 3/0482* | (2013.01) | |
| *G06F 3/0484* | (2022.01) | |
| *G06F 3/0488* | (2022.01) | |
| *G06V 20/40* | (2022.01) | |
| *G06F 3/04883* | (2022.01) | |
| *G06F 3/04845* | (2022.01) | |
| *G06F 3/04817* | (2022.01) | |

(52) U.S. Cl.
CPC .......... *G06T 19/006* (2013.01); *G06F 3/0482* (2013.01); *G06F 3/0484* (2013.01); *G06F 3/04817* (2013.01); *G06F 3/04845* (2013.01); *G06F 3/04883* (2013.01); *G06V 20/41* (2022.01)

(58) Field of Classification Search
CPC .......... G06K 9/00335; G06K 9/00342; G06K 9/00362; G06T 7/20; G06T 7/11; G06T 19/006; G06F 3/04817; G06F 3/0482; G06F 3/0484; G06F 3/04845; G06F 3/04883
See application file for complete search history.

(56) References Cited

U.S. PATENT DOCUMENTS

| | | | | |
|---|---|---|---|---|
| 2006/0110049 | A1* | 5/2006 | Liang | A61B 5/1118 382/224 |
| 2007/0229522 | A1* | 10/2007 | Wang | A61B 5/7264 345/547 |
| 2010/0111359 | A1* | 5/2010 | Bai | A01K 29/005 382/103 |
| 2015/0223731 | A1* | 8/2015 | Sahin | A61B 5/1123 600/301 |
| 2015/0269730 | A1 | 9/2015 | Lee | |

(Continued)

*Primary Examiner* — Jin Cheng Wang
(74) *Attorney, Agent, or Firm* — Fernando & Partners, LLP

(57) ABSTRACT

A method includes obtaining a plurality of sequential images. The method includes identifying a first plurality of pixel sets respectively associated with the plurality of sequential images. Each of the first plurality of pixel sets locates a first object within a corresponding sequential image on a per-pixel basis. The method includes determining a characterization vector of the first object by extracting a corresponding plurality of displayable characteristic values based on the first plurality of pixel sets. Each of the plurality of displayable characteristic values is associated with a corresponding pixel set and a corresponding sequential image. The characterization vector includes a plurality of distinct temporal values respectively associated with the corresponding plurality of displayable characteristic values. The method includes generating a first behavioral value for the first object based on a function of the corresponding plurality of displayable characteristic values and the plurality of distinct temporal values.

20 Claims, 19 Drawing Sheets

(56) References Cited

U.S. PATENT DOCUMENTS

| | | | |
|---|---|---|---|
| 2015/0359201 A1* | 12/2015 | Kong | A01K 29/005 |
| | | | 348/89 |
| 2017/0124400 A1 | 5/2017 | Yehezkel Rohekar et al. | |
| 2017/0161554 A9 | 6/2017 | Hong et al. | |
| 2018/0365842 A1 | 12/2018 | Bozorgtabar et al. | |
| 2020/0258314 A1* | 8/2020 | Nonoyama | G06F 3/014 |
| 2020/0312003 A1* | 10/2020 | Borovikov | G06T 13/40 |
| 2020/0337272 A1* | 10/2020 | Kumar | G06T 7/194 |

\* cited by examiner

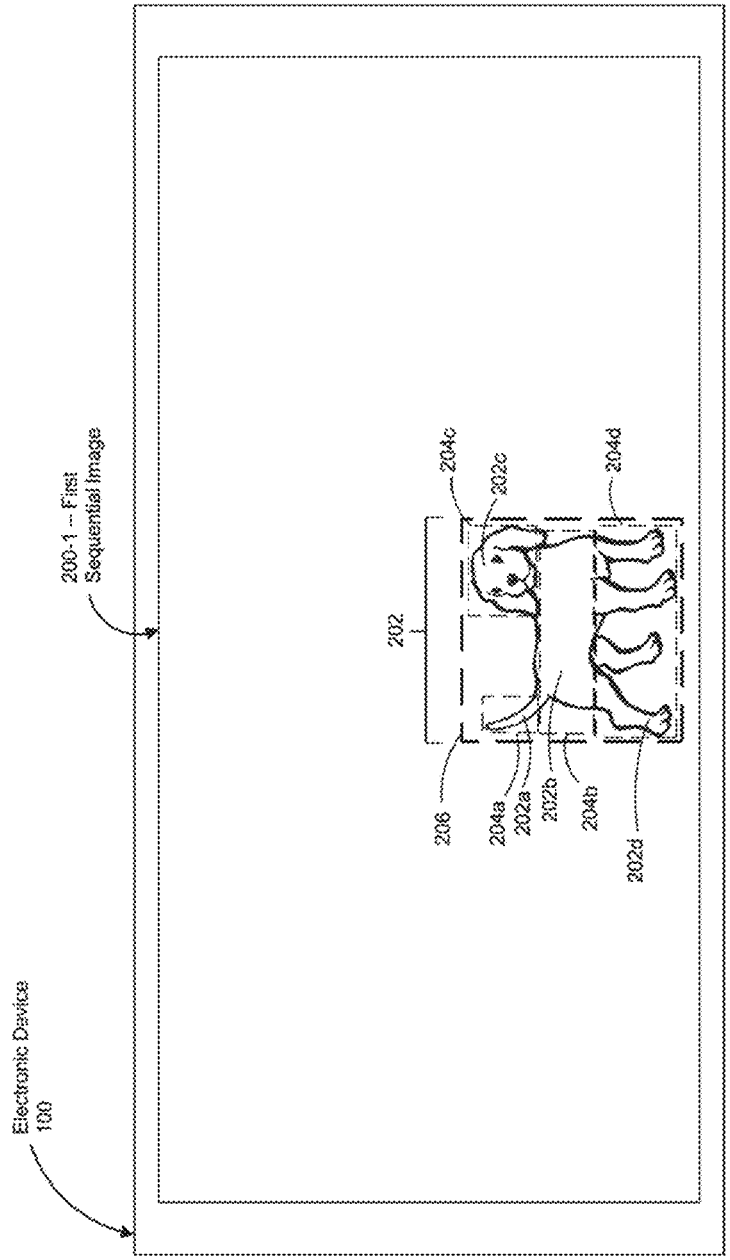

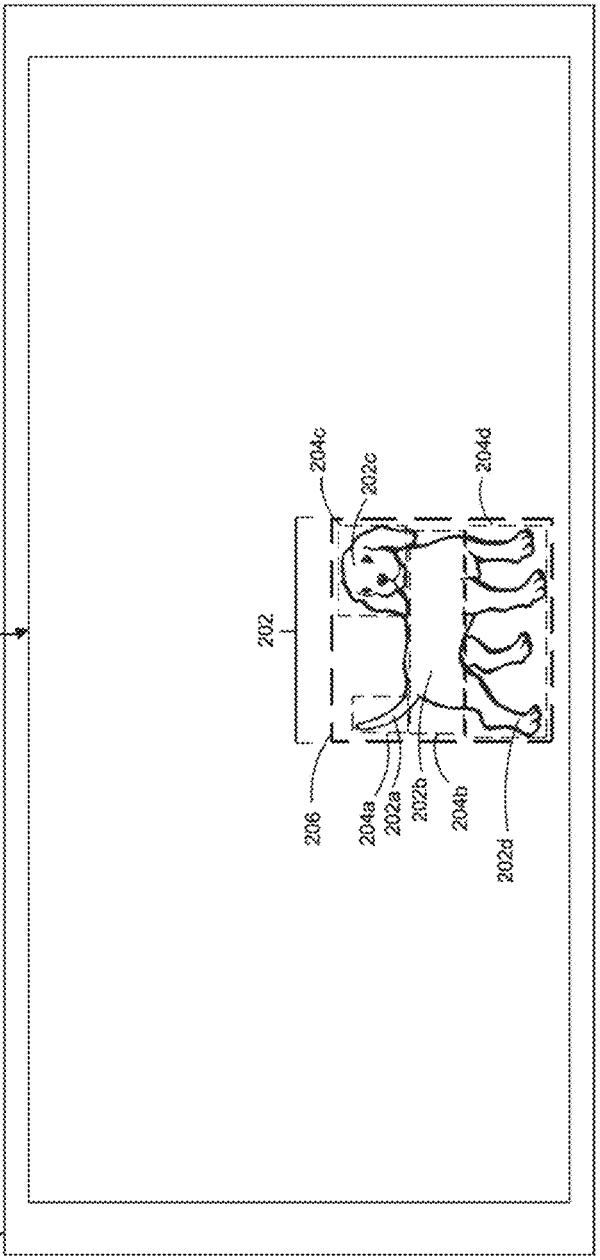

ns, reference should be made to the Description,
TEMPORAL SEGMENTATION

CROSS-REFERENCE TO RELATED APPLICATION

This application claims priority to U.S. Provisional Patent App. No. 62/904,452 filed on Sep. 23, 2019, which is hereby incorporated by reference in its entirety.

TECHNICAL FIELD

The present disclosure relates to temporal segmentation and, in particular, assessing temporal changes to an object across a plurality of sequential images.

BACKGROUND

Previously available methods of segmentation utilize individual video frames and/or an individual image as inputs, and provide as output pixel labels. For example, methods of instance segmentation are used to identify the number of distinct objects within an individual video frame and/or an individual image, without providing information about the nature of any of the identified objects. As another example, methods of semantic segmentation determine semantic information (e.g., an understanding or meaning) about the identified objects.

However, previously available methods of segmentation cannot determine temporal attributes characterizing an object, which are shown across multiple video frames and not readily discernable using a single video frame. In other words, previously available methods of segmentation do not extract temporal information across multiple video frames.

SUMMARY

In accordance with some implementations, a method is performed at an electronic device with one or more processors and a non-transitory memory. The method includes obtaining a plurality of sequential images. Each of the plurality of sequential images includes a first object. The method includes identifying, within the plurality of sequential images, a first plurality of pixel sets respectively associated with the plurality of sequential images. Each of the first plurality of pixel sets locates the first object within a corresponding one of the plurality of sequential images on a pixel-by-pixel basis. The method includes determining a characterization vector of the first object by extracting, from the plurality of sequential images, a corresponding plurality of displayable characteristic values based on the first plurality of pixel sets. Each of the plurality of displayable characteristic values is associated with a corresponding one of the first plurality of pixel sets and a corresponding one of the plurality of sequential images. The characterization vector also includes a plurality of distinct temporal values respectively associated with the corresponding plurality of displayable characteristic values. The method includes generating a first behavioral value for the first object based on a function of the corresponding plurality of displayable characteristic values and the plurality of distinct temporal values.

In accordance with some implementations, an electronic device includes one or more processors and a non-transitory memory. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 2A-2K are an example of an electronic device performing temporal segmentation with respect to a plurality of sequential images in accordance with some implementations.

SUMMARY

Figure 1:
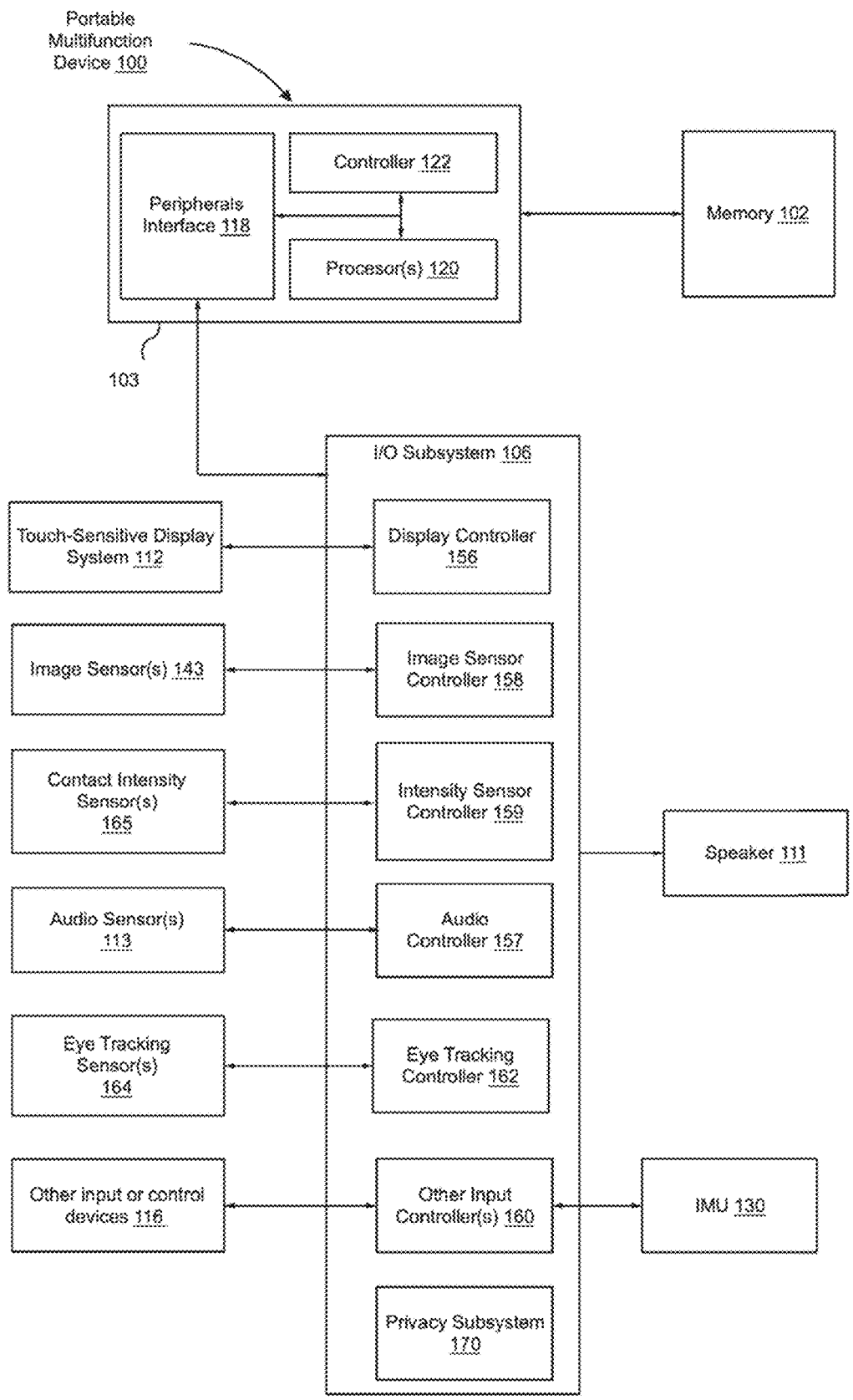
FIG. 1 is a block diagram of an example of a portable multifunction device in accordance with some implementations.

In some circumstances, conventional segmentation methods assess an individual image or an individual video frame, such as identifying a particular object within an image. However, conventional segmentation methods cannot effectively determine how objects within a series of images or a video stream change over time. Because conventional segmentation methods are limited to using information within an individual image or an individual video frame, they cannot assess temporal information across multiple images or video frames.

By contrast, various implementations disclosed herein include systems, methods, and electronic devices that generate a behavioral value for an object by comparing determined characteristic values of the object across a corresponding plurality of sequential images. The method includes identifying a plurality of pixel sets that locates an object within a plurality of sequential images and utilizing the plurality of pixel sets in order to determine a characterization vector of the object that characterizes the object over time. Based on the characterization vector, the method includes generating a behavioral value for the object. Accordingly, the method enables assessing temporal changes to features (e.g., objects) within an image stream or video stream.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the Sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor (s) 113 (e.g., microphone), eye tracking sensor(s) 164 (e.g., included within a head-mountable device (HMD)), and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) corresponds to one or more HMD cameras.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2K are an example of an electronic device 100 performing temporal segmentation with respect to a plurality of sequential images in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the electronic device 100 corresponds to a mobile device, such as a smartphone, tablet, media player, laptop, etc. In some implementations, the electronic device 100 corresponds to a head-mountable device (HMD) that includes an integrated display (e.g., a built-in display) that displays the plurality of sequential images. In some implementations, the HMD includes a head-mountable enclosure. In various implementations, the head-mountable enclosure includes an attachment region to which another device with a display can be attached. In various implementations, the head-mountable enclosure is shaped to form a receptacle for receiving another device that includes a display. For example, in some implementations, the electronic device 100 slides/snaps into or otherwise attaches to the head-mountable enclosure. In some implementations, the display of the device attached to the head-mountable enclosure presents (e.g., displays) the plurality of sequential images. For example, in some implementations, the electronic device 100 corresponds to a mobile phone that can be attached to the head-mountable enclosure.

Figure 2A:
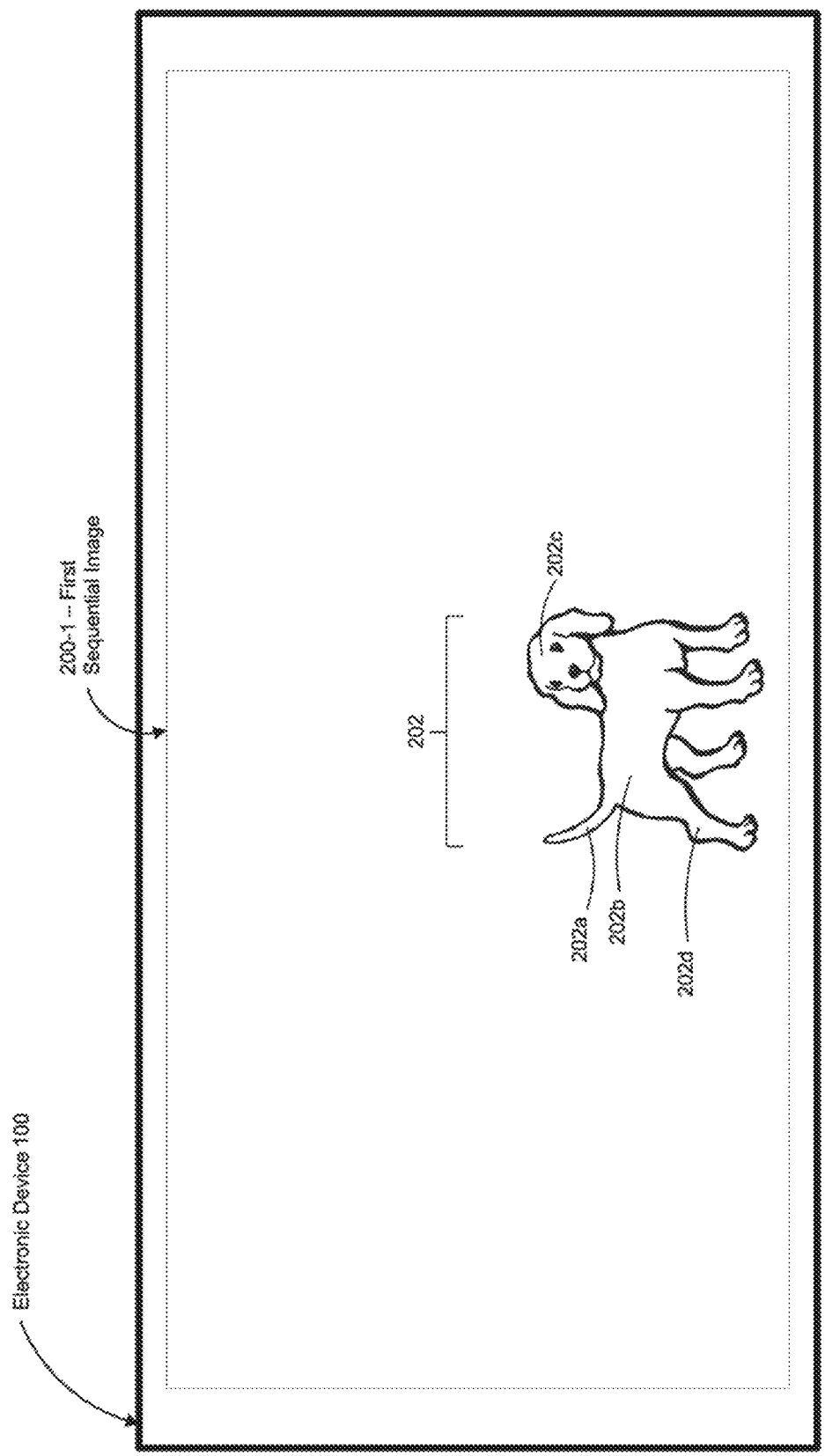

As illustrated in FIG. 2A, the electronic device 100 obtains and displays, via a display device, a first sequential image 200-1 of a plurality of sequential images. The first sequential image 200-1 includes a first object corresponding to a dog 202. The dog 202 includes a tail 202a, a body 202b, a head 202c, and legs 202d. One of ordinary skill in the art will appreciate that, in some implementations, the first sequential image 200-1 includes a plurality of objects, and the electronic device 100 may perform temporal segmentation on some or all of the plurality of objects. In some implementations, the electronic device 100 obtains the plurality of sequential images from an image sensor, such as a rear-facing camera on a mobile device. In some implementations, the image sensor is integrated within a head-mountable device (HMD). For example, the electronic device 100 corresponds to a base computation unit in a scenario where an HMD is tethered (wired or wireless) to a base unit.

As illustrated in FIG. 2B, the electronic device 100 identifies the dog 202 and portions thereof. To that end, according to various implementations, the electronic device 100 generates instance label values (e.g., via instance segmentation) and/or generates semantic label values (e.g., via semantic segmentation). Instance label values identify respective objects without regard to an understanding or meaning of the objects, such as "first object," "second object," etc. Semantic label values, on the other hand, identify respective objects with an understanding or meaning about the objects, such as dog, tail, brown tail, furry tail, etc. Referring to FIG. 2B, the electronic device 100 generates a tail label value 204a corresponding to the tail 202a, a body label value 204b corresponding to the body 202b, a head label value 204c corresponding to the head 202c, a legs label value 204d corresponding to the body 202d, and a dog label value 206 corresponding to the dog 202 as a whole. These label values may be a combination of instance label values and semantic label values. In some implementations, each label value is associated with a pixel set that locates the correspond object on a pixel-by-pixel basis.

As illustrated in FIG. 2C, the electronic device 100 determines a characterization vector 210 for the dog 202 within the first sequential image 200-1. The characterization vector 210 includes a first distinct temporal value 220-1 that is associated with the first sequential image 200-1. For example, in some implementations, the first distinct temporal value 220-1 provides a timestamp indicating when the electronic device 100 obtains the first sequential image 200-1.

The characterization vector 210 includes a first pixel location of information of interest 230-1 that locates a first pixel within the first sequential image 200-1. In this example, the first pixel location of information of interest 230-1 locates the tail 202a. One of ordinary skill in the art will appreciate that the characterization vector 210 may include any number of pixel location of information of interest entries. For example, in some implementations, the characterization vector 210 include various pixel location of information of interest entries that respectively locate the dog 202, the body 202b, the head 202c, the legs 202d, or a portion thereof.

In some implementations, the characterization vector 210 includes an RGB (red, green, blue) value 240 that provides color characteristics of the first pixel. One of ordinary skill in the art will appreciate that the characterization vector 210 may include any number of RGB values, each providing color characteristics of a corresponding pixel.

The characterization vector 210 includes a number of label values corresponding to previously identified objects within the first sequential image 200-1. Namely, the characterization vector 210 includes an instance label value 250 of "Object No. 1" that corresponds to the dog label value 206 illustrated in FIG. 2B. One of ordinary skill in the art will appreciate that the characterization vector 210 may include any number of instance label values (e.g., "Object No. 2," Object No. 3," etc.) respectively corresponding to, for example, the tail label value 204a, the body label value 204b, the head label value 204c, and the legs label value 204d.

The characterization vector 210 includes a number of semantic label values that semantically identify corresponding objects within the first sequential image 200-1. The semantic label values may semantically identify an object within the first sequential image 200-1 or a feature of the object. With respect to semantic segmentation of objects, the characterization vector 210 includes a first semantic label value 260 of "Dog" that corresponds to the dog label value 206 and a second semantic label value 270 of "Tail" that corresponds to the tail label value 204a. With respect to semantic segmentation of features of the object, the characterization vector 210 includes a third semantic label value 272 of "Furry" that describes the tail 202a and a fourth semantic label value 274 of "White" that also describes the tail 202a. One of ordinary skill in the art will appreciate that the characterization vector 210 may include any number of semantic label values.

The characterization vector 210 includes a first displayable characteristic value 280-1 of "Upwards" that provides a characteristic of the tail 202a. The first displayable characteristic value 280-1 is associated with the first pixel.

Figure 2D:
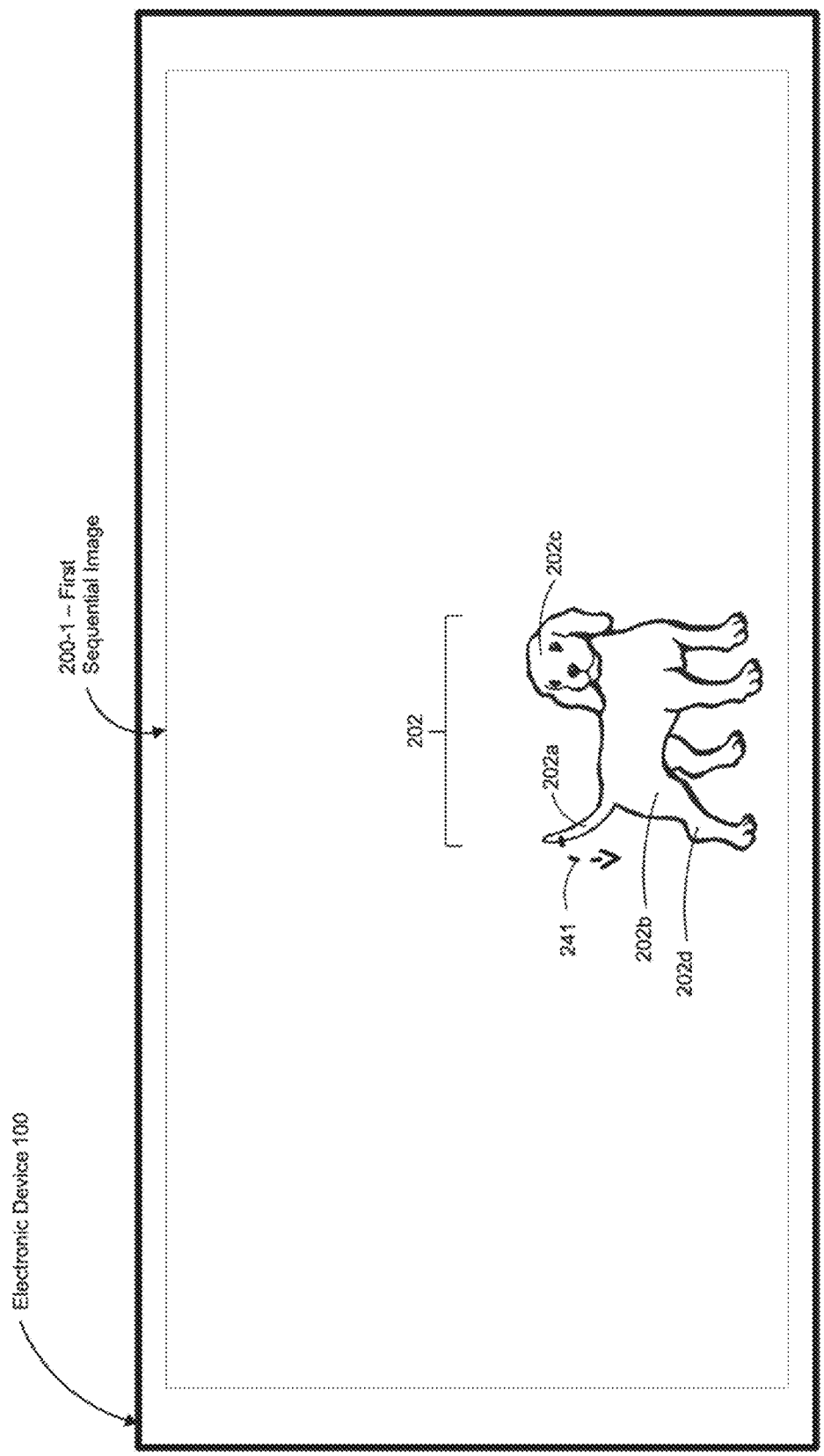
Figure 2E:
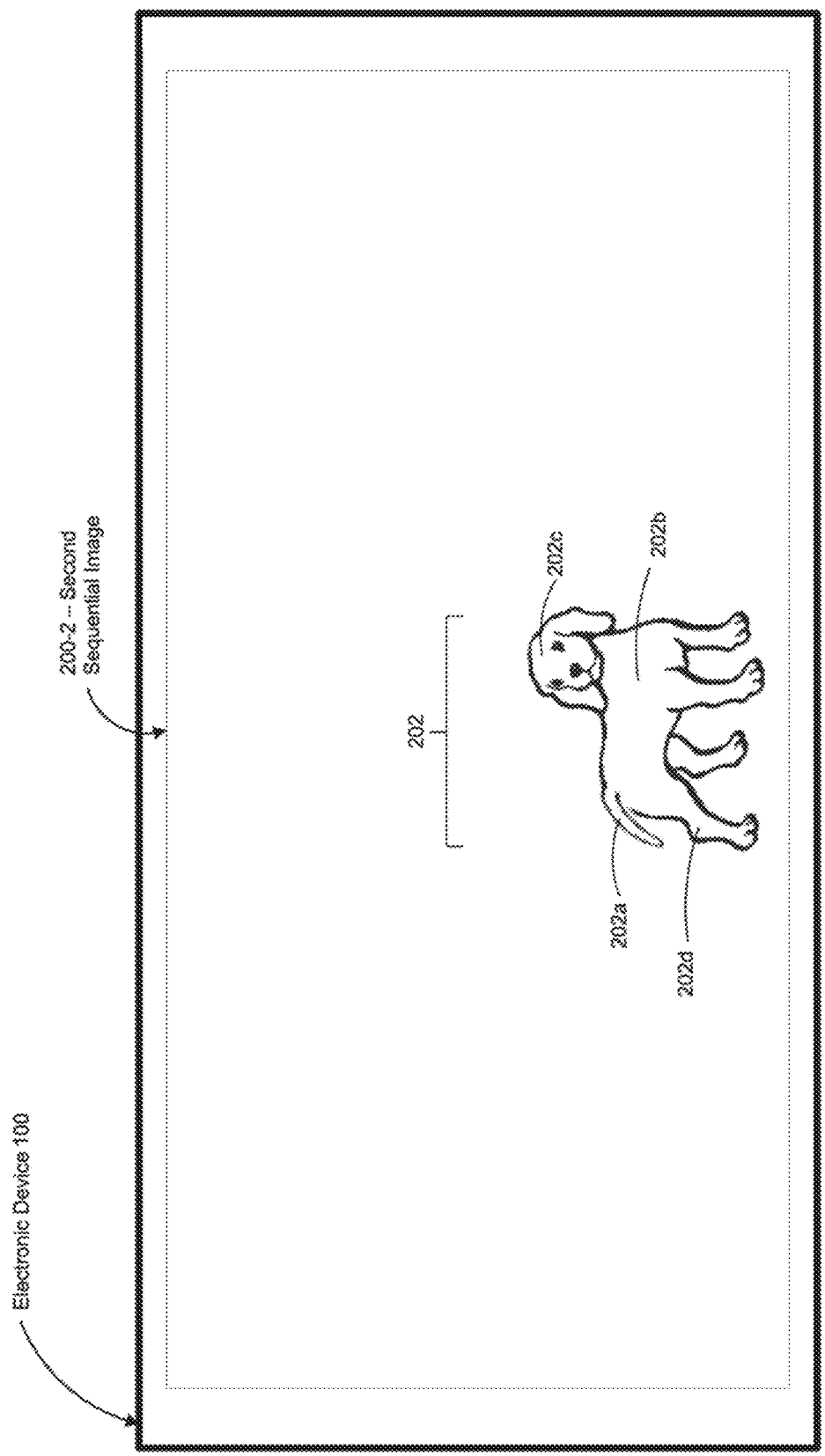
Figures 2F, 2G:
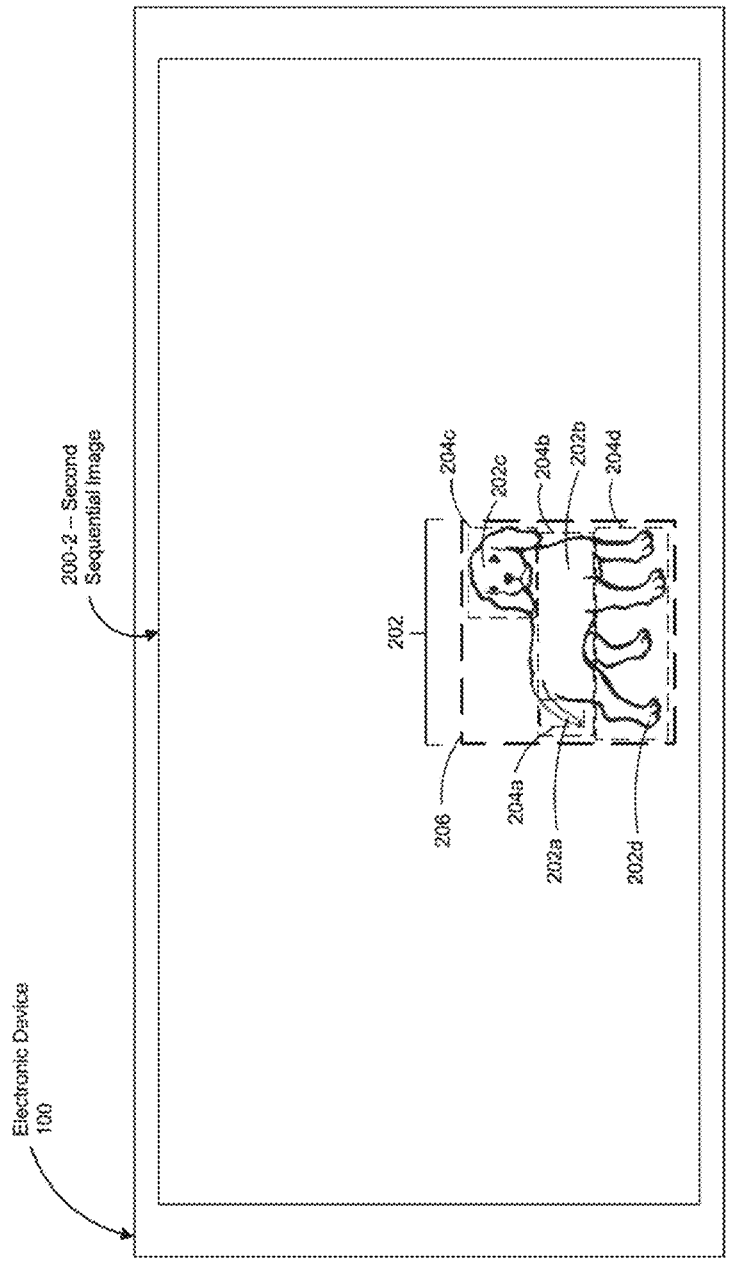

As illustrated in FIG. 2D, the tail 202a begins wagging downwards, as indicated by the movement arrow 241, which is illustrated for purely explanatory purposes. A second sequential image 200-2 with the tail 202a having finished wagging downwards is illustrated in FIG. 2E. As illustrated in FIG. 2F, the electronic device 100 generates, for the second sequential image 200-2, the tail label value 204a, the body label value 204b, the head label value 204c, the legs label value 204d, and the dog label value 206.

As illustrated in FIG. 2G, the electronic device 100 adds a second row to the characterization vector 210 that is associated with the second sequential image 200-2. The electronic device 100 adds a second distinct temporal value 220-2 that is associated with the second sequential image 200-2. The electronic device 100 adds a second pixel location of information of interest 230-2 that locates a second pixel within the second sequential image 200-2. The second pixel includes the same information as the first pixel. Because of the wagging of the tail 202a, the second pixel is lower (e.g., nearer to the bottom of the image) than the first pixel. Accordingly, the electronic device 100 adds a second displayable characteristic value 280-2 of "Downwards" because the tail is pointing downwards in the second sequential image 200-2. The electronic device 100 adds an instance label value 250 and semantic label values 260, 270, 272, and 274 that are associated with the second sequential image 200-2. The instance label value 250 and semantic label values 260, 270, 272, and 274 are the same for the first sequential image 200-1 and the second sequential image 200-2 because both the first sequential image 200-1 and the second sequential image 200-2 include the dog 202 and the portions thereof 202a-202d. However, the first displayable characteristic value 280-1 is different from the second displayable characteristic value 280-2 because the tail 202a changed from pointing upwards in the first sequential image 200-1 to pointing downwards in the second sequential image 200-2.

Based on a function of the first displayable characteristic value 280-1 and associated first distinct temporal value 220-1, and the second displayable characteristic value 280-2 and associated second distinct temporal value 220-2, the electronic device 100 generates a first behavioral value for the dog 202. For example, the first behavioral value is "excited" because the change from the first displayable characteristic value 280-1 of "Upwards" to the second displayable characteristic value 280-2 of "Downwards" indicates a wagging tail, which is a sign of an excited dog.

Figure 2H:
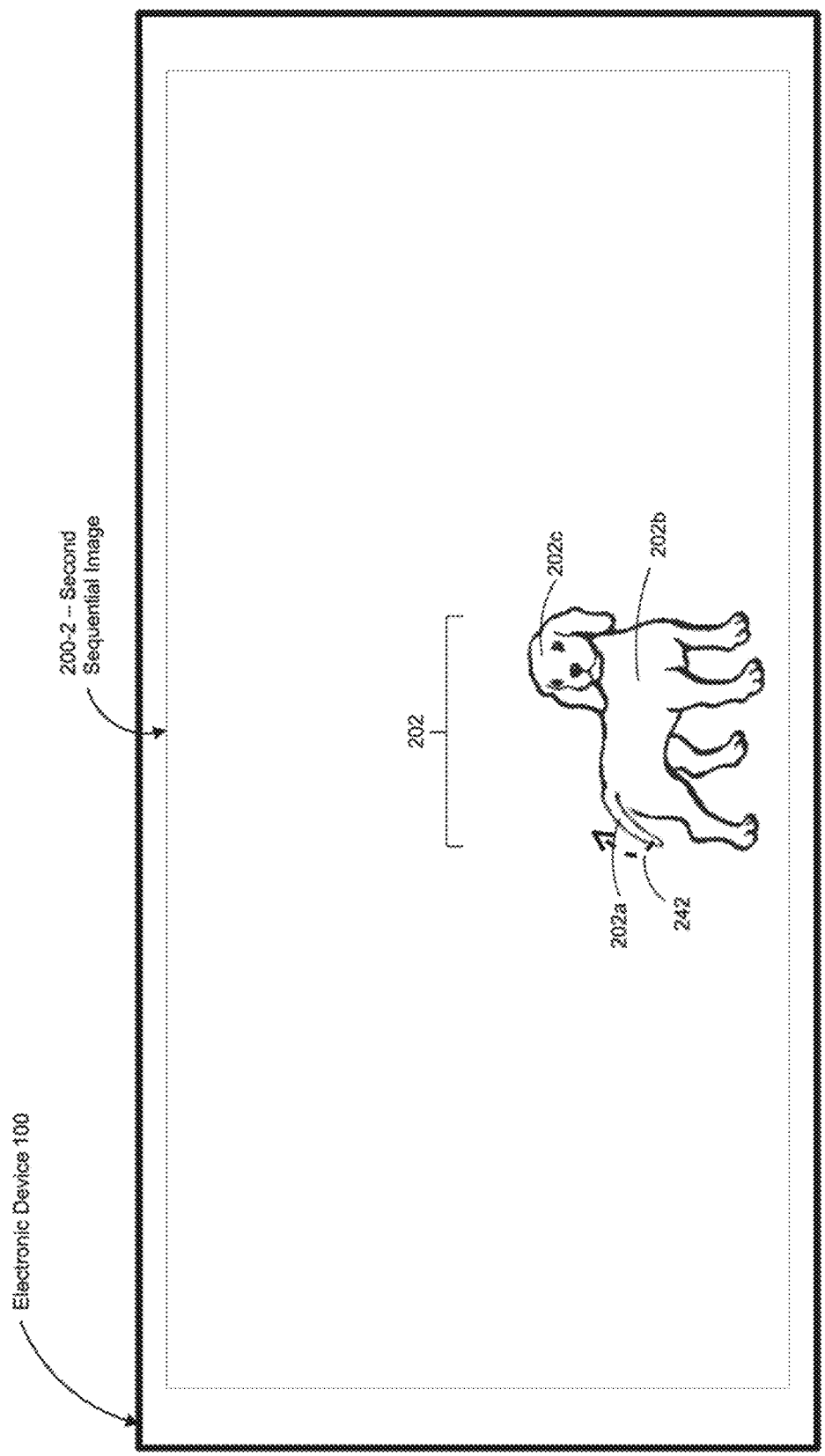
Figure 2I:
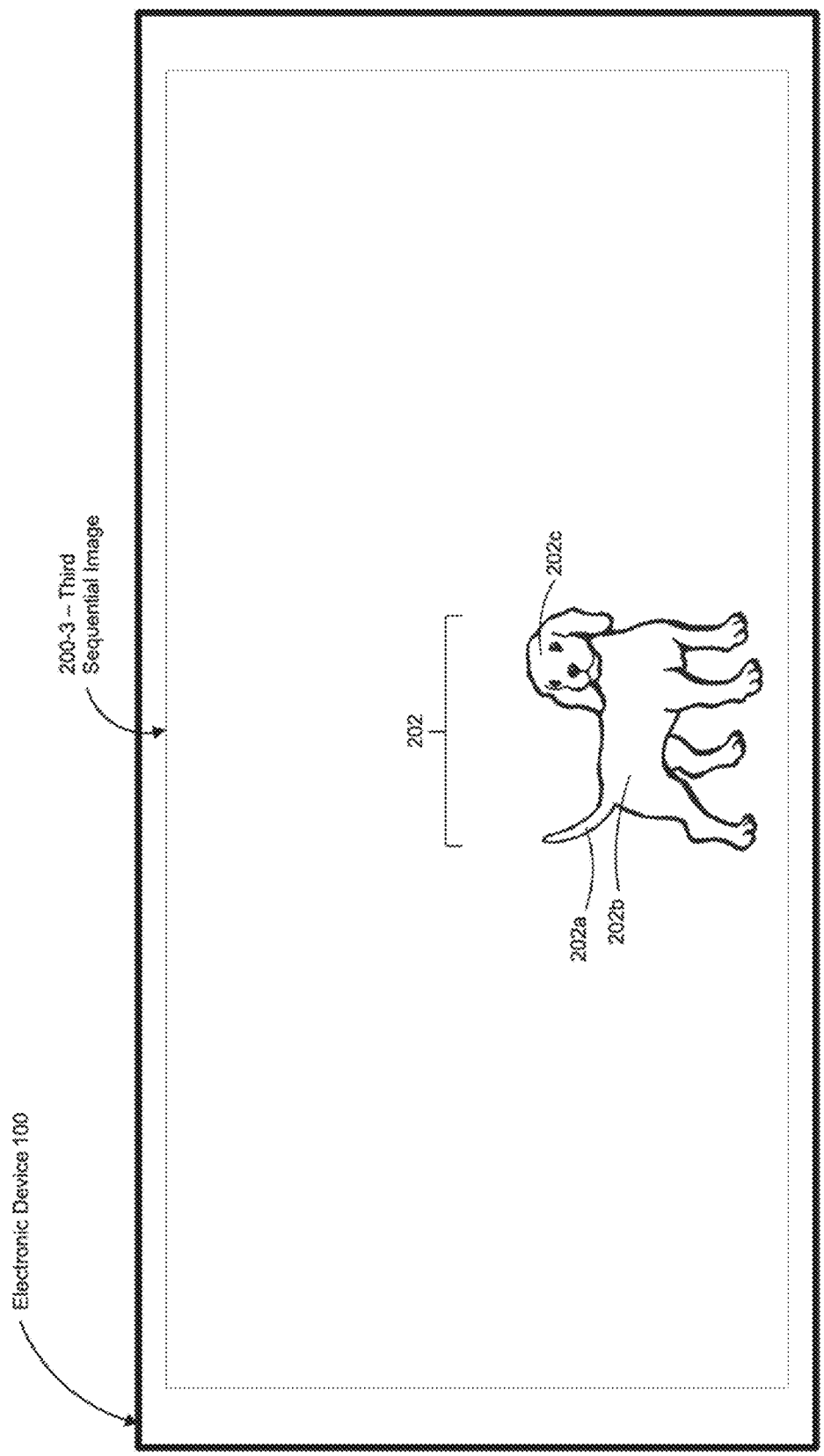

As illustrated in FIG. 2H, the tail 202a begins wagging upwards, as indicated by the movement arrow 242, which is illustrated for purely explanatory purposes. A third sequential image 200-3 with the tail 202a having finished wagging upwards is illustrated in FIG. 2I. As illustrated in FIG. 2J, the electronic device 100 generates, for the third sequential image 200-3, the tail label value 204a, the body label value 204b, the head label value 204c, the legs label value 204d, and the dog label value 206.

As illustrated in FIG. 2K, the electronic device 100 adds a third row to the characterization vector 210 that is associated with the third sequential image 200-3. The electronic device 100 adds a third distinct temporal value 220-3 that is associated with the third sequential image 200-3. The electronic device 100 adds a third pixel location of information of interest 230-3 that locates a third pixel within the third sequential image 200-3. The third pixel includes the same information as the first and second pixels. The electronic device 100 adds a third displayable characteristic value 280-3 of "Upwards" because the tail 202a is pointing upwards in the third sequential image 200-3. The electronic device 100 adds an instance label value 250 and semantic label values 260, 270, 272, and 274 that are associated with the third sequential image 200-3. The instance label value 250 and semantic label values 260, 270, 272, and 274 are the same for the first sequential image 200-1, the second sequential image 200-2, and the third sequential image 200-3 because the first sequential image 200-1, the second sequential image 200-2, and the third sequential image 200-3 include the dog 202 and the portions thereof 202a-202d. However, the second displayable characteristic value 280-2 is different from the third displayable characteristic value 280-3 because the tail 202a changed from pointing downwards in the second sequential image 200-2 to pointing upwards in the third sequential image 200-3.

Based on a function of a combination of the first displayable characteristic value 280-1 and associated first distinct temporal value 220-1, the second displayable characteristic value 280-2 and associated second distinct temporal value 220-2, and the third displayable characteristic value 280-3 and associated second distinct temporal value 220-3, the electronic device 100 generates a second behavioral value for the dog 202. For example, the second behavioral value corresponds to "excited" because the first displayable characteristic value 280-1, the second displayable characteristic value 280-2, and the third displayable characteristic value 280-3 collectively indicate wagging of the tail 202a, which itself is indicative of an excited dog. If, on the other hand, the third distinct characteristic value 280-3 had been "Between the legs" because the third sequential image 200-3 included the tail 202a being between the legs 202d, then the electronic device 100 may generate a second behavioral value of "embarrassed."

Figure 3:
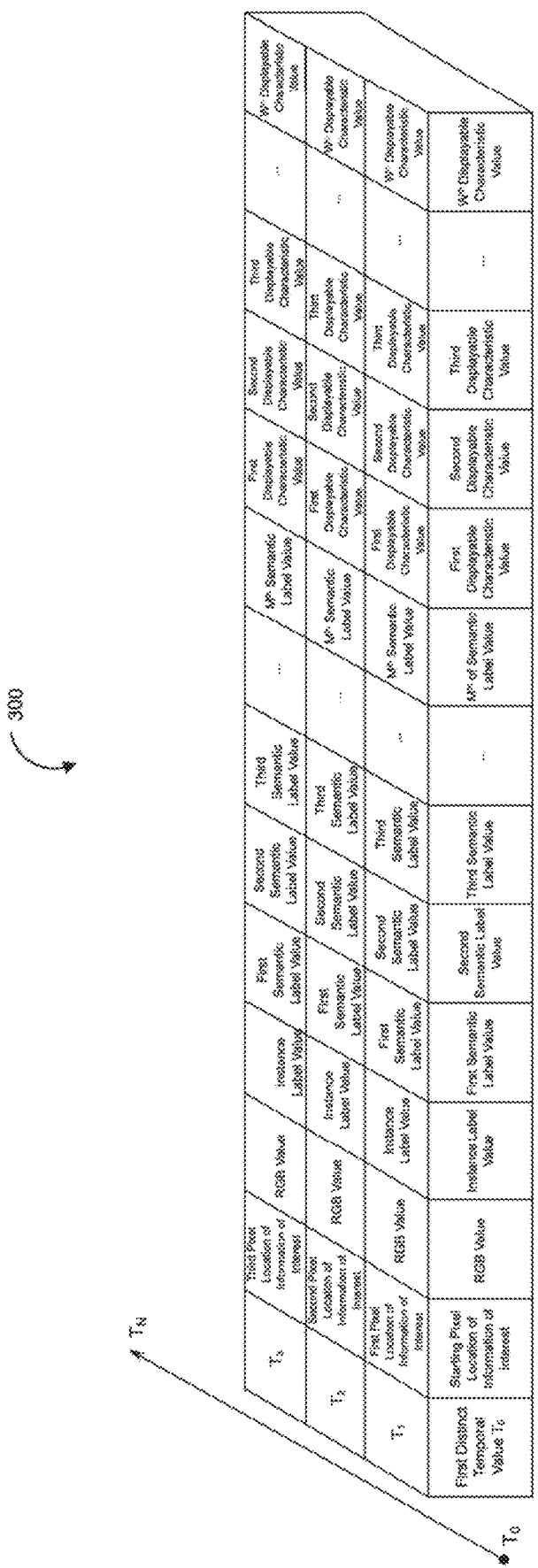
FIG. 3 is an example of a time-sequence of a characterization vector that is associated with information of interest within a plurality of sequential images in accordance with some implementations.

FIG. 3 is an example of a time-sequence of a characterization vector 300 that is associated with information of interest within a plurality of sequential images in accordance with some implementations. Each row of the characterization vector 300 is associated with a distinct one of the plurality of sequential images. In some implementations, the characterization vector 300 is similar to the characterization vector 210.

The first row (e.g., the bottom row) of the characterization vector 300 includes a first distinct temporal value $T_0$ associated with a first sequential image of the plurality of sequential images. For example, with reference to FIGS. 2B and 2C, the first row of the characterization vector 300 characterizes the first sequential image 200-1 that is associated with the first distinct temporal value 220-1. The first row of the characterization vector 300 includes a starting pixel location of information of interest that locates a first pixel. For example, with reference to FIG. 2B, the starting pixel location of information of interest locates a pixel corresponding to the tip of the tail 202a of the dog 202. Continuing wits this example, the characterization vector 300 characterizes the tip of the tail 202a as the information of interest. The first row of the characterization vector 300 also includes an RGB value that is associated with the information of interest and includes an instance label value (e.g. corresponding to the dog 202). Moreover, the first row of the characterization vector 300 includes a first semantic label value, a second semantic label value, . . . , and an $M^{th}$ semantic label value that semantically characterize various objects and features within the first sequential image. Moreover, the first row of the characterization vector 300 includes a first displayable characteristic value, a second displayable characteristic value, . . . , and a $W^{th}$ displayable characteristic value provide characteristics about objects and features within the first sequential image. For example, with reference to FIGS. 2B and 2C, the first displayable characteristic value 280-1 indicates that the tail 202a is "Upwards" with reference to the first sequential image 200-1.

The remaining rows of the characterization vector 300 are associated with the information of interest across different sequential images that are respectively associated with distinct temporal vales $T_1, T_2, T_3, \ldots, T_N$. Each of the remaining rows of the characterization vector 300 includes a pixel location of information that locates the information of interest located by the starting pixel location information of interest. Continuing with the previous example, the remaining rows of the characterization vector 300 include respective pixel locations of information that locate the tip of the tail 202a of the dog 202. With reference to FIGS. 2E-2K, because the tail 202a is moving in the second sequential image 200-2 and the third sequential image 200-3, the corresponding displayable characteristic values reflect the movement of the tail 202a. Moreover, each of the remaining rows of the characterization vector 300 includes an RGB value, an instance label value, and various semantic label values and displayable characteristic values.

Figure 4:
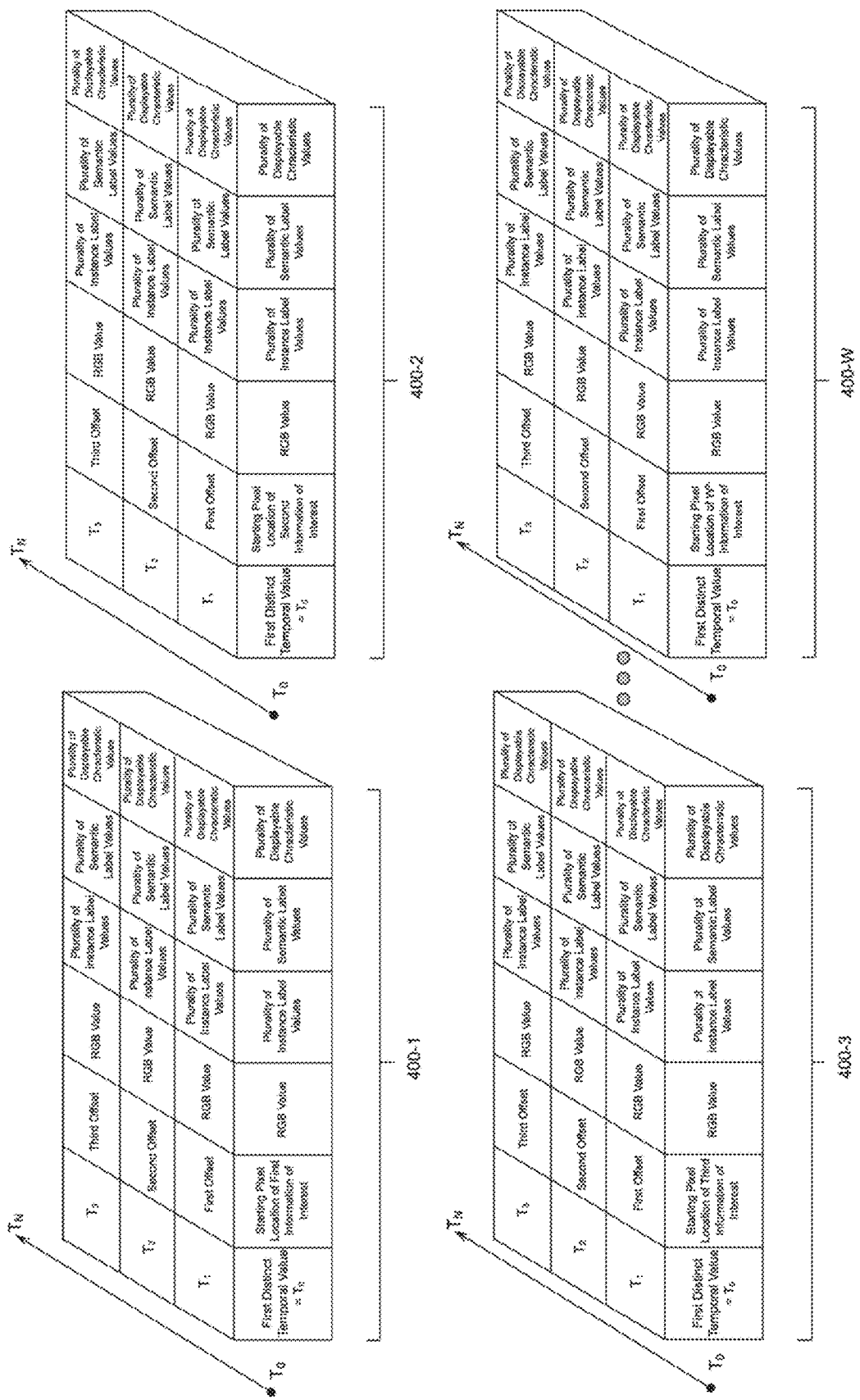
FIG. 4 is an example of a time-sequence of a plurality of characterization vectors respectively associated with a plurality of information sets of interest within a plurality of sequential images in accordance with some implementations.

FIG. 4 is an example of a time-sequence of a plurality of characterization vectors 400-1, . . . , 400-W respectively associated with a plurality of information sets of interest within a plurality of sequential images in accordance with some implementations. In some implementations, each of the plurality of characterization vectors 400-1, . . . , 400-W is similar to the characterization vector 300 in FIG. 3.

In some implementations, each of the plurality of characterization vectors 400-1, 400-W provides temporal characteristics of a distinct portion of an object within a plurality of sequential images. The object may correspond to an entire object (e.g., dog 202) or a portion thereof (e.g., the legs 202d). For example, with reference to the first sequential image 200-1 in FIG. 2A, the first characterization vector 400-1 includes (for time=$T_0$) a starting pixel location of first information of interest that locates a first portion of the dog 202, the second characterization vector 400-2 includes (for time=$T_0$) a starting pixel location of second information of interest that locates a second portion of the dog 202, the third characterization vector 400-3 includes (for time=$T_0$) a starting pixel location of third information of interest that locates a third portion of the dog 202, etc. Continuing the previous example, each of the plurality of characterization vectors 400-1, . . . , 400-W tracks a respective portion of the dog 202. Namely, with reference to the second sequential image 200-2 in FIG. 2E, the electronic device 100 adds to the first characterization vector 400-1 (for time=$T_1$) a first offset that locates the first portion of the dog 202, adds to the second characterization vector 400-2 (for time=$T_1$) a second offset that locates the second portion of the dog 202, adds to the third characterization vector 400-3 (for time=$T_1$) a first offset that locates the third portion of the dog 202, etc. In some implementations, an offset provides distance information relative to one or more previously identified locations of information of interest. In some implementations, the offset provides absolute distance information, such as x-y coordinates of a respective pixel.

Figure 5A:
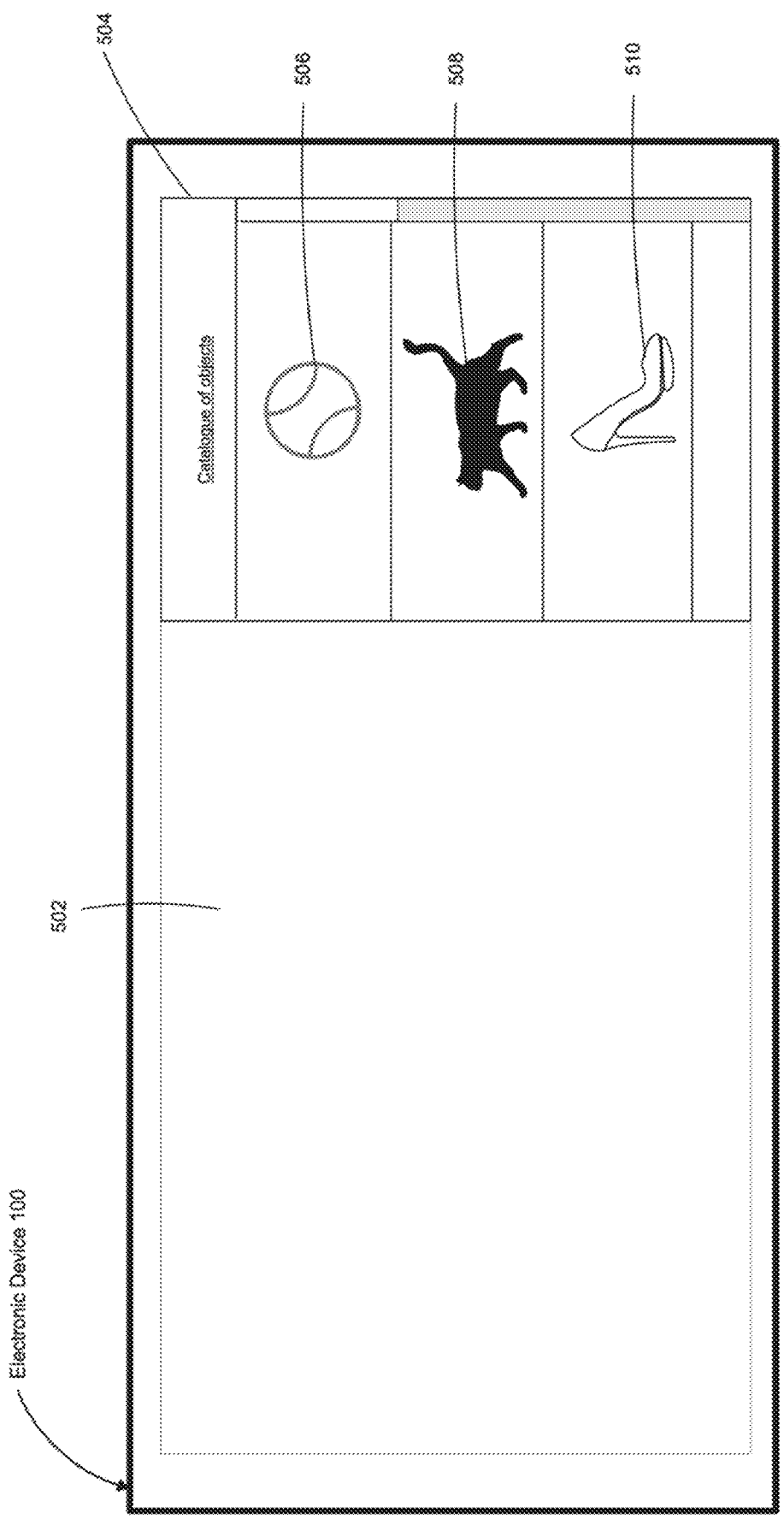
FIGS. 5A-5G is an example of recommending objective-effectuators based on generated behavioral values in accordance with some implementations.

FIGS. 5A-5G is an example of recommending objective-effectuators based on generated behavioral values in accordance with some implementations. As illustrated in FIG. 5A, an electronic device 100 (e.g., the electronic device 100 in FIG. 1 or the electronic device 100 in FIGS. 2A-2K) displays, on a display 502, a catalogue of objects 504. The catalogue of objects 504 includes a baseball 506, a cat 508, and a shoe 510.

Figure 5B:
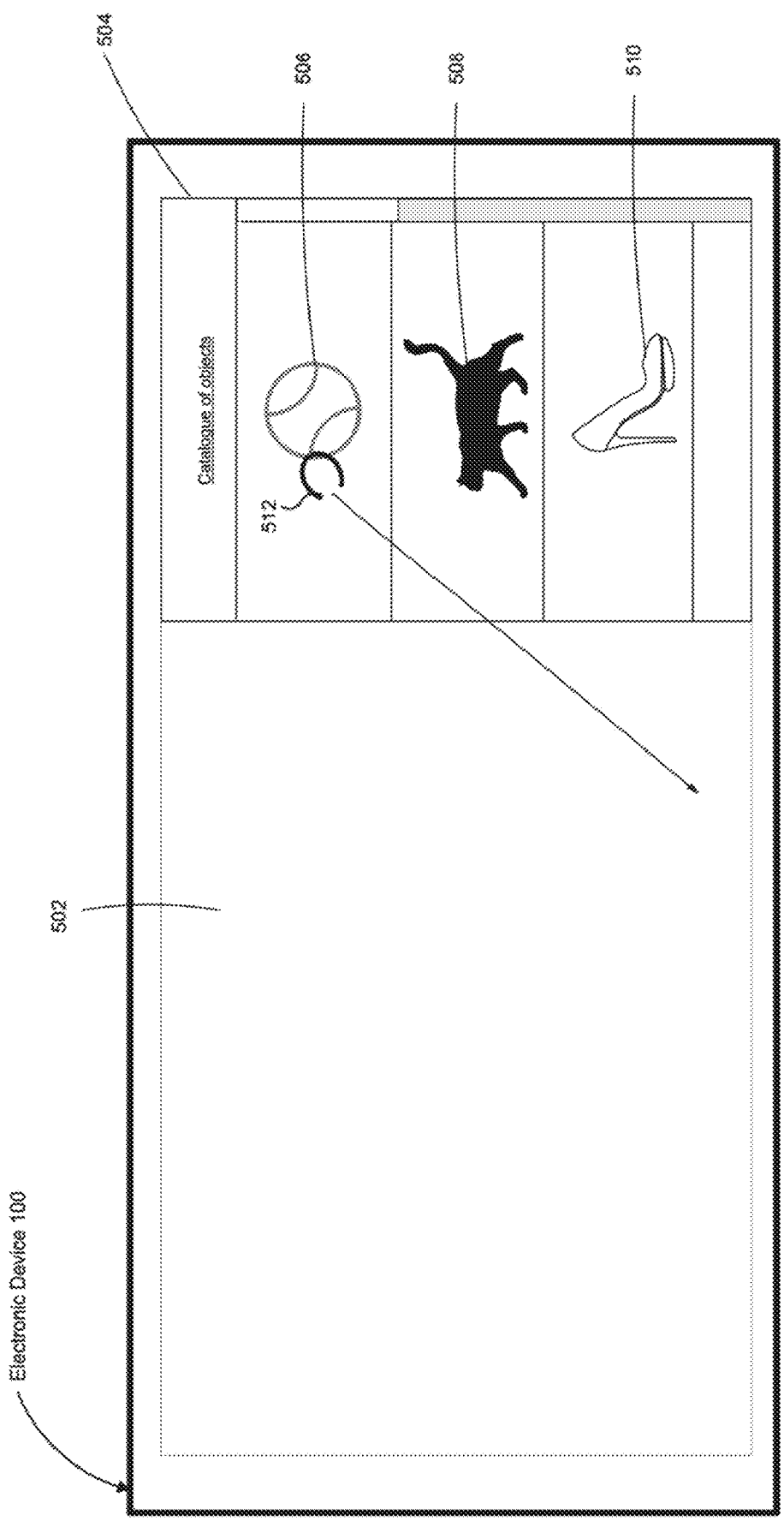
Figure 5C:
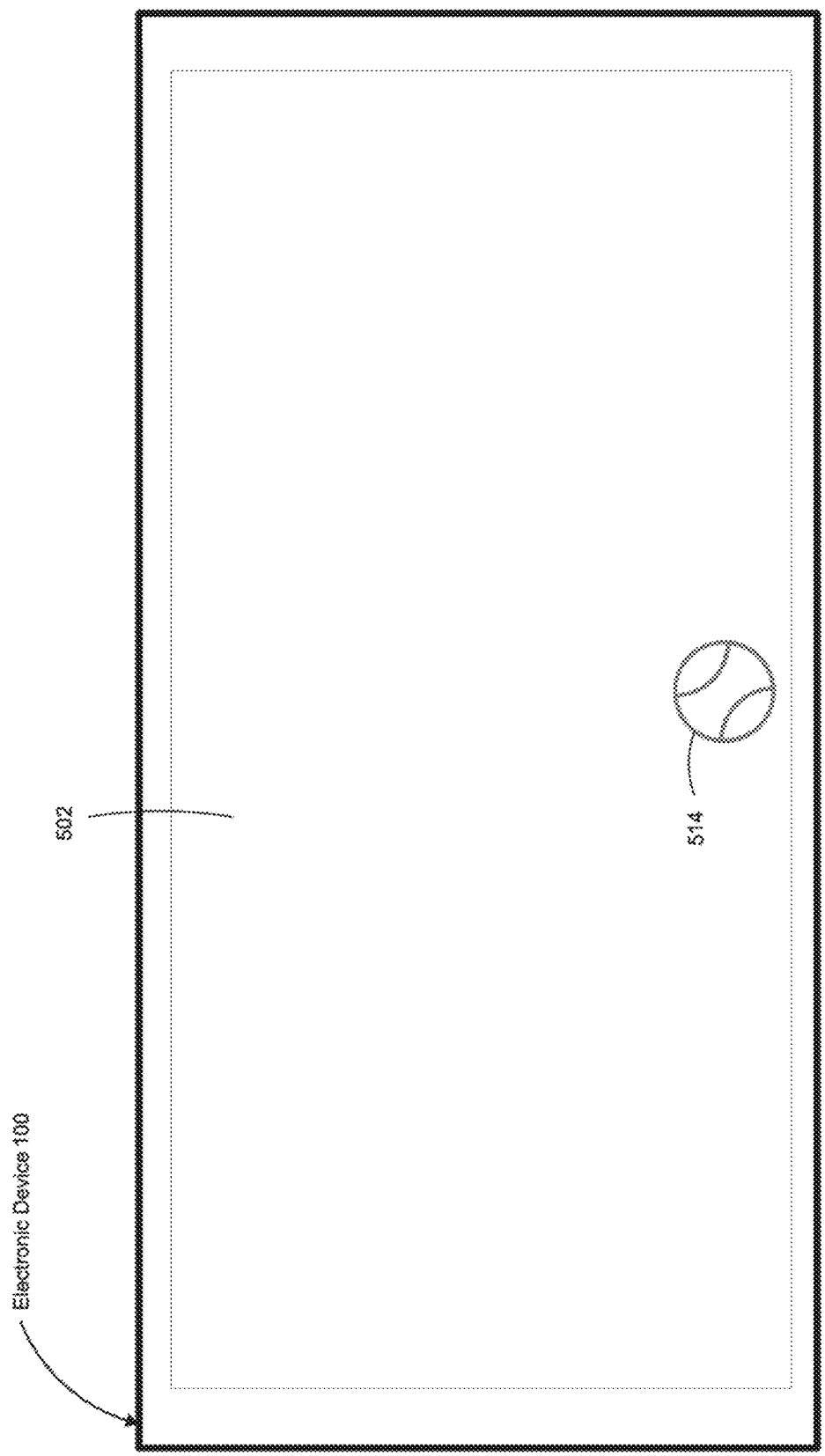

As illustrated in FIG. 5B, the electronic device 100 detects an input 512 that moves the baseball 506 onto the display 502. In response to detecting the input 512 in FIG. 5B, the electronic device 100 displays a baseball object 514 in FIG. 5C.

Figure 5D:
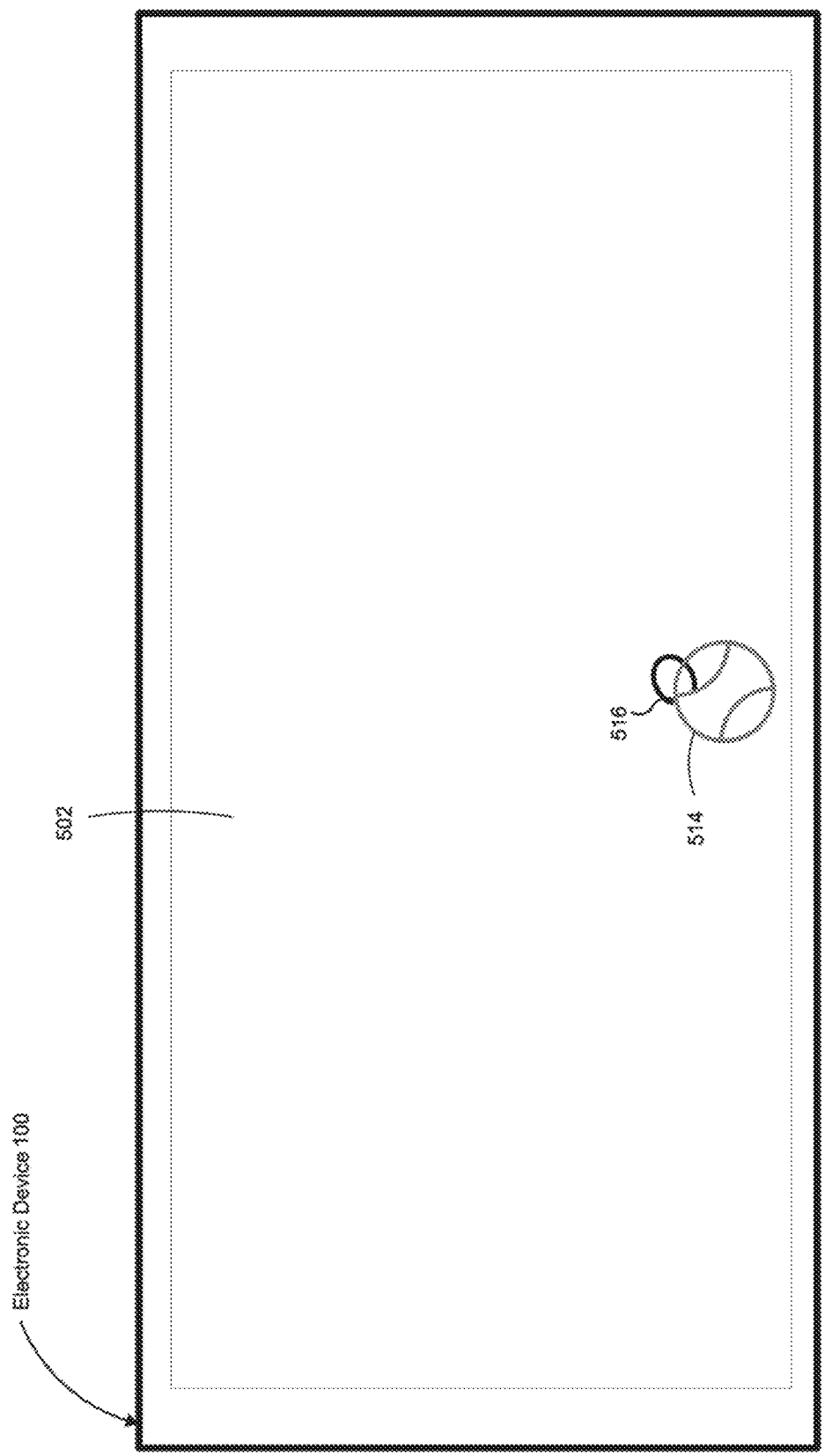

As illustrated in FIG. 5D, the electronic device 100 detects a recommendation request 516 that is directed to the baseball object 514, such as a touch input directed to the baseball object 514 on a touch-sensitive surface of the electronic device 100. For example, the recommendation request 516 requests the electronic device 100 to provide recommendations associated with the baseball object 514.

Figure 5E:
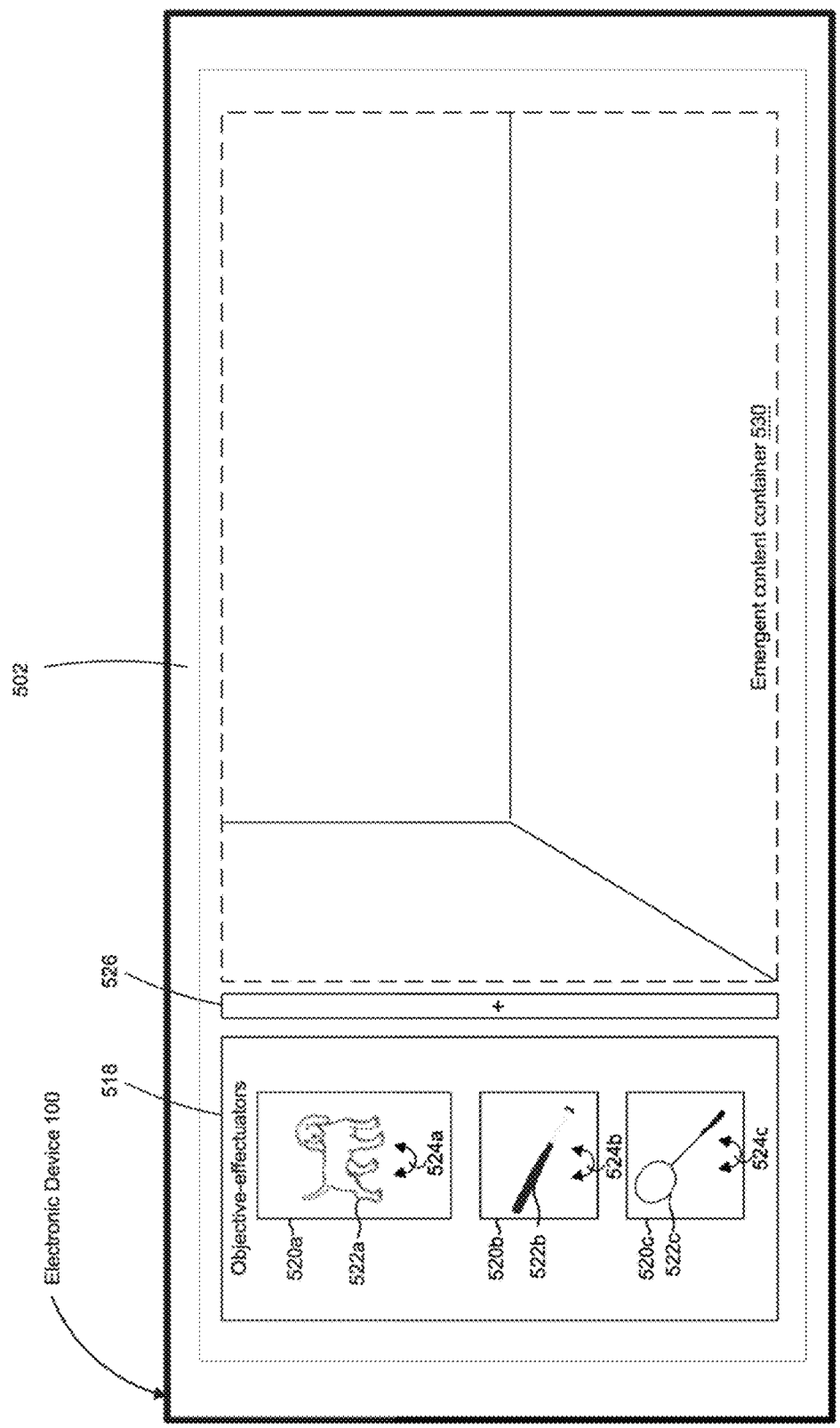

In response to detecting the recommendation request 516 in FIG. 5D, the electronic device 100 displays an objective-effectuator interface in FIG. 5E. The objective-effectuator interface includes an objective-effectuator pane 518, a new container affordance 526, and an emergent content container 530.

The objective-effectuator pane 518 includes various objective-effectuators that correspond to recommendations based on the baseball object 514. The objective-effectuator pane 518 includes a dog objective-effectuator 522a within a dog objective-effectuator container 520a, a bat objective-effectuator 522b within a bat objective-effectuator container 520b, and a badminton racket objective-effectuator 522c within a badminton racket objective-effectuator container 520c. The objective-effectuator pane 518 includes the dog objective-effectuator 522a because of the first behavioral value for the dog 202 generated by the electronic device 100 with reference to FIGS. 2A-2K. Namely, the first behavioral value for the dog 202 corresponds to "excited," and the electronic device 100 determines that an excited dog likes to play with the baseball object 514. For example, in some implementations, the electronic device 100 obtains information (e.g., from the Internet) that maps various moods of a dog to corresponding activities, such as that an excited dog likes to catch or retrieve a ball.

In various implementations, an objective-effectuator performs one or more actions. In some implementations, an objective-effectuator performs a sequence of actions. In some implementations, the emergent content container 530 determines the actions that an objective-effectuator is to perform. In some implementations, the actions of the objective effectuators are within a degree of similarity to actions of the corresponding characters/things. For example, in some implementations, the dog objective-effectuator 522a is characterized by objectives of chasing cars, fetching a ball, etc. As another example, a respective manipulation affordance enables rotation, size change, and/or positional change of the corresponding objective-effectuator.

In some implementations, the dog objective-effectuator container 520a includes a dog manipulation affordance 524a to manipulate the dog objective-effectuator 522a, the bat objective-effectuator container 520b includes a bat manipulation affordance 524b to manipulate the bat objective-effectuator 522b, and the badminton racket objective-effectuator container 520c includes a badminton racket manipulation affordance 524c to manipulate the badminton racket objective-effectuator 522a. For example, a respective manipulation affordance enables rotation, size change, and/or positional change of the corresponding objective-effectuator.

In some implementations, the emergent content container 530 enables an objective-effectuator to perform actions that satisfy an objective (e.g., a set of predefined objectives) of the objective-effectuator. In some implementations, the electronic device 100 receives an input (e.g., a user input) to instantiate an objective-effectuator in the emergent content container 530. In such implementations, the emergent content container 530 generates actions for the objective-effectuator after the objective-effectuator is instantiated in the emergent content container 530. For example, in some implementations, the emergent content container 530 synthesizes actions that satisfy a set of predefined objectives for the objective-effectuator. In some implementations, the emergent content container 530 selects the actions from a set of predefined actions.

In some implementations, the emergent content container 530 includes a computer-mediated scene. For example, in some implementations, the computer-mediated scene forms a background for the emergent content container 530. In some implementations, the computer-mediated scene includes a virtual scene that is a simulated replacement of a real-world scene. In other words, in some implementations, the computer-mediated scene is simulated by the electronic device 100. In such implementations, the computer-mediated scene is different from a real-world scene where the electronic device 100 is located. In some implementations, the computer-mediated scene includes an augmented scene that is a modified version of a real-world scene. For example, in some implementations, the electronic device 100 modifies (e.g., augments) the real-world scene where the electronic device 100 is located in order to generate the computer-mediated scene. In some implementations, the electronic device 100 generates the computer-mediated scene by simulating a replica of the real-world scene where the electronic device 100 is located. In some implementations, the electronic device 100 generates the computer-mediated scene by removing and/or adding items from the simulated replica of the real-world scene where the electronic device 100 is located.

In some implementations, the emergent content container 530 is generated based on a user input. For example, in some implementations, the electronic device 100 receives a user input indicating a terrain for the emergent content container 530. In such implementations, the electronic device 100 configures the emergent content container 530 such that the emergent content container 530 includes the terrain indicated via the user input. In some implementations, the user input indicates environmental conditions. In such implementations, the electronic device 100 configures the emergent content container 530 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain or snow).

In some implementations, when the new container affordance 526 is selected, the electronic device 100 creates a new emergent content container. As such, in some implementations, the electronic device 100 displays multiple emergent content containers (e.g., two or more emergent content, such as the emergent content container 530 adjacent to one or more additional emergent content containers (not shown).

Figure 5F:
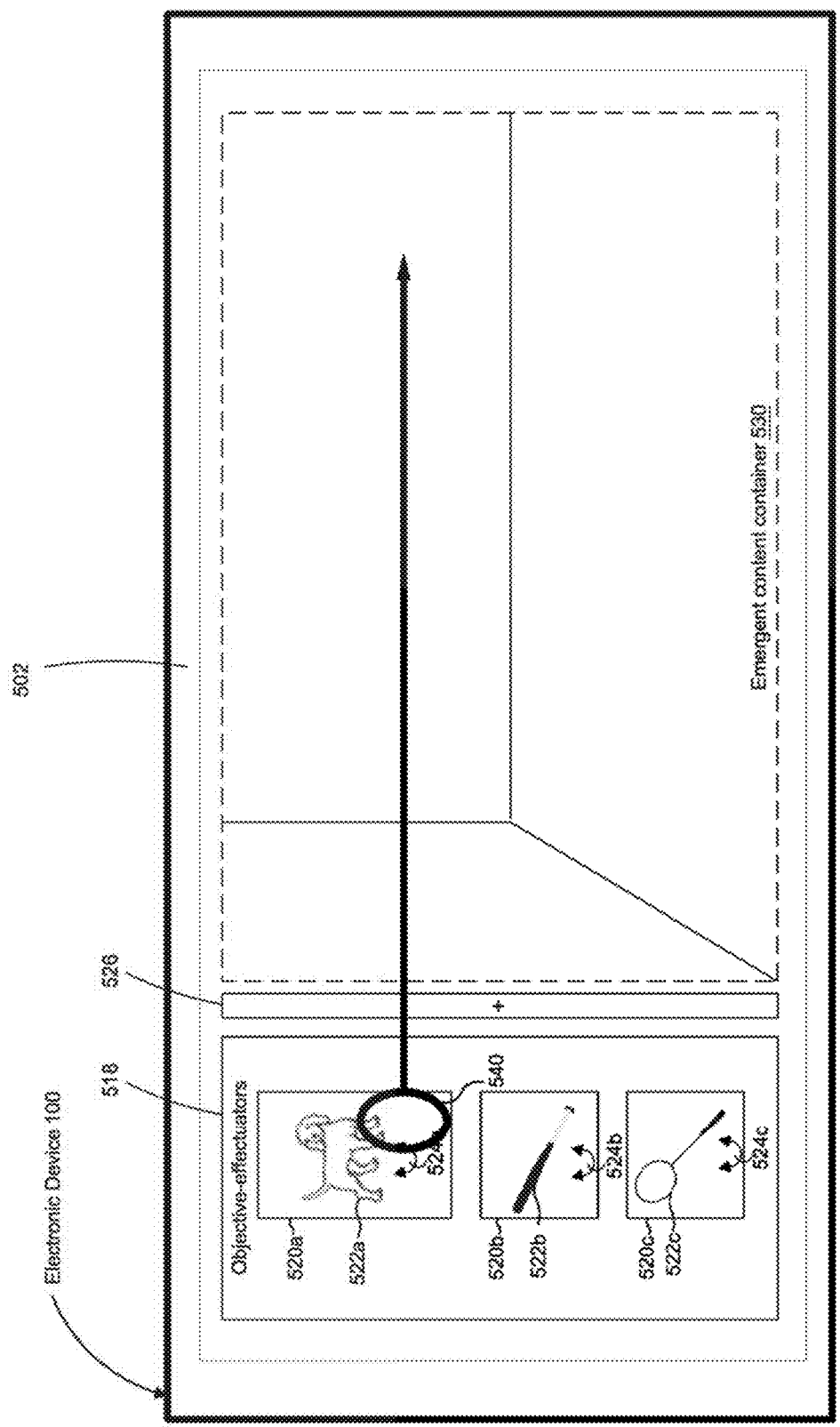

Referring to FIG. 5F, the electronic device 100 detects an input 540 at a location corresponding to the dog objective-effectuator container 520a. In the example of FIG. 5F, the input 540 corresponds to a request to instantiate the dog objective-effectuator 522a in the emergent content container 530. In the example of FIG. 5F, detecting the input 540 includes detecting that the dog objective-effectuator container 520a has been selected, and that the dog objective-effectuator container 520a is being dragged into a display region that corresponds to the emergent content container 530. In some implementations, detecting the input 540 includes detecting that the dog objective-effectuator container 520a is being dragged into the emergent content container 530.

Figure 5G:
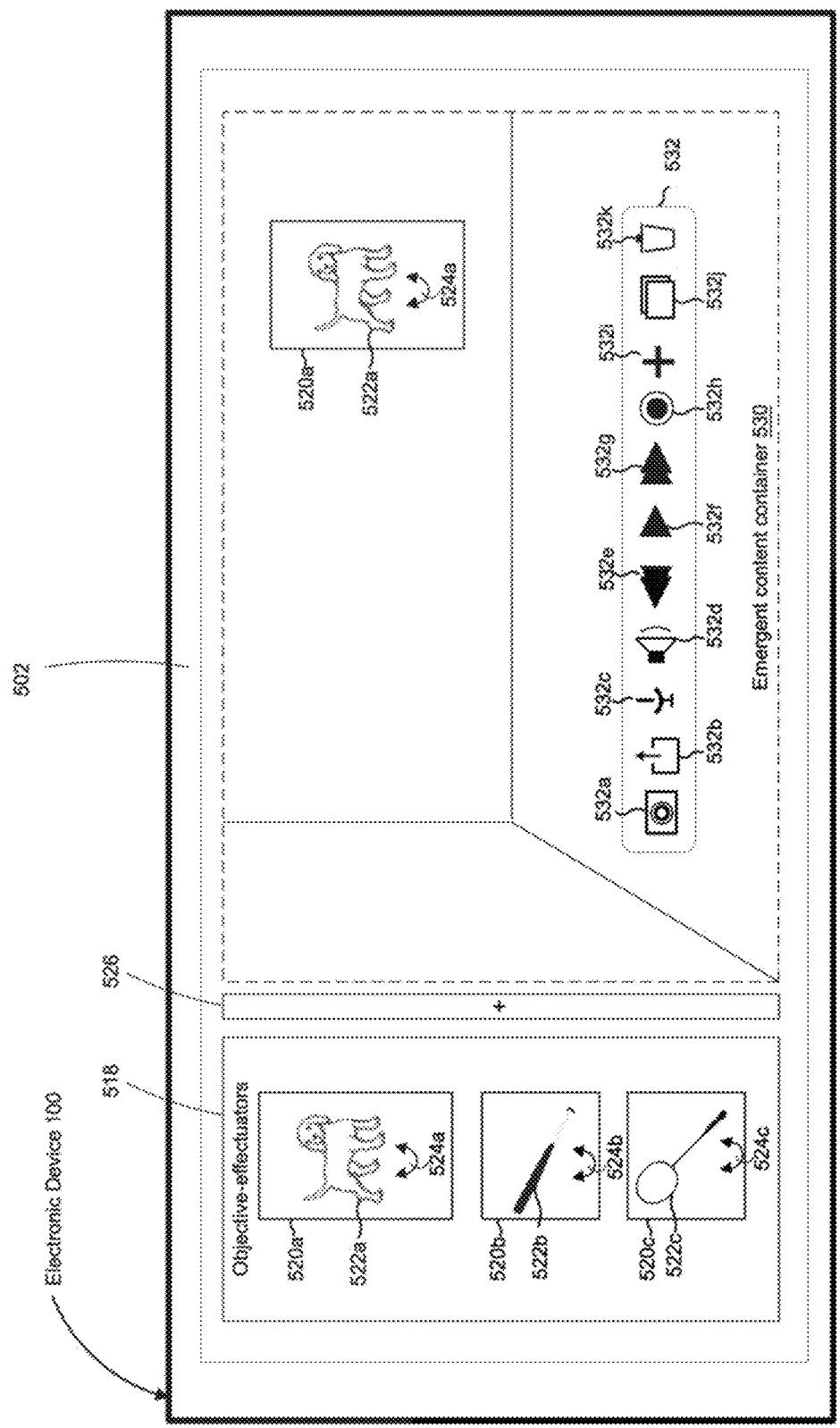

Referring to FIG. 5G, after detecting the input 540 shown in FIG. 5F, the electronic device 100 instantiates the dog objective-effectuator 522a in the emergent content container 530. In the example of FIG. 5G, the emergent content container 530 includes the dog objective-effectuator container 520a because the emergent content container 530 is being set up. In other words, in the example of FIG. 5G, the emergent content container 530 is in an edit mode in which objective-effectuators are being added to the emergent content container 530.

As illustrated in FIG. 5G, in various implementations, the emergent content container 530 includes various container affordances 532. In some implementations, the container affordances 532 are grouped into a container affordance bar. In various implementations, the container affordances 532 allow various operations to be performed in relation to the emergent content container 530. For example, in some implementations, the container affordances 532 include a screen capture affordance 532a which, in response to being selected, captures an image of the emergent content container 530. In some implementations, the container affordances 532 include a share affordance 532b which, in response to being selected, provides options to share the emergent content container 530 with other devices (e.g., other devices of the same user and/or other devices of other users).

In some implementations, the container affordances 532 include a microphone (mic) affordance 532c which, in response to being selected, allows the user of the electronic device 100 to interact with the objective-effectuators that are instantiated in the emergent content container 530. For example, in some implementations, in response to detecting a selection of the mic affordance 532c, the emergent content container 530 receives an audio input. In such implementations, the emergent content container 530 causes the objective-effectuators that are instantiated in the emergent content container 530 to respond to the audio input. For example, the emergent content container 530 changes the actions that the instantiated objective-effectuators perform in response to the audio input.

In some implementations, the container affordances 532 include a speaker affordance 532d that, when selected, enables the user of the electronic device 100 to control a volume associated with the emergent content container 530 (e.g., so that the user can listen to dialogues recited by the objective-effectuators instantiated in the emergent content container 530).

In some implementations, the container affordances 532 include content playback affordances such as a rewind affordance 532e, a play affordance 532f and a fast forward affordance 532g. In some implementations, a selection of the play affordance 532f causes the emergent content container 530 to transition from the edit mode to a play mode in which the objective-effectuators instantiated in the emergent content container 530 start performing their respective actions. In some implementations, the rewind affordance 532e, when selected, causes the content displayed by the emergent content container 530 to be rewound. In some implementations, the fast forward affordance 532g, when selected, causes the content displayed by the emergent content container 530 to be fast-forwarded. In some implementations, the container affordances 532 include a record affordance 532h that, when selected, causes the content displayed by the emergent content container 530 to be recorded.

In some implementations, the container affordances 532 include an add objective-effectuator affordance 532i that, when selected, provides an option to add an objective-effectuator to the emergent content container 530. In some implementations, the add objective-effectuator affordance 532i allows additional instances of an objective-effectuator that is already instantiated in the emergent content container 530 to be instantiated. In some implementations, the add objective-effectuator affordance 532i allows an instance of an objective-effectuator that is not currently instantiated in the emergent content container 530 to be instantiated.

In some implementations, the container affordances 532 include a duplicate objective-effectuator affordance 532j that, when selected, provides an option to duplicate (e.g., replicate) an objective-effectuator that is already instantiated in the emergent content container 530. In the example of FIG. 5G, a selection of the duplicate objective-effectuator affordance 532j provides an option to duplicate the dog objective-effectuator 522a that is already instantiated in the emergent content container 530.

In some implementations, the container affordances 532 include a delete objective-effectuator affordance 532k that, when selected, provides an option to delete an objective-effectuator that is instantiated in the emergent content container 530. In the example of FIG. 5G, a selection of the delete objective-effectuator affordance 532k provides an option to delete the dog objective-effectuator 522a that is already instantiated in the emergent content container 530.

Figure 6:
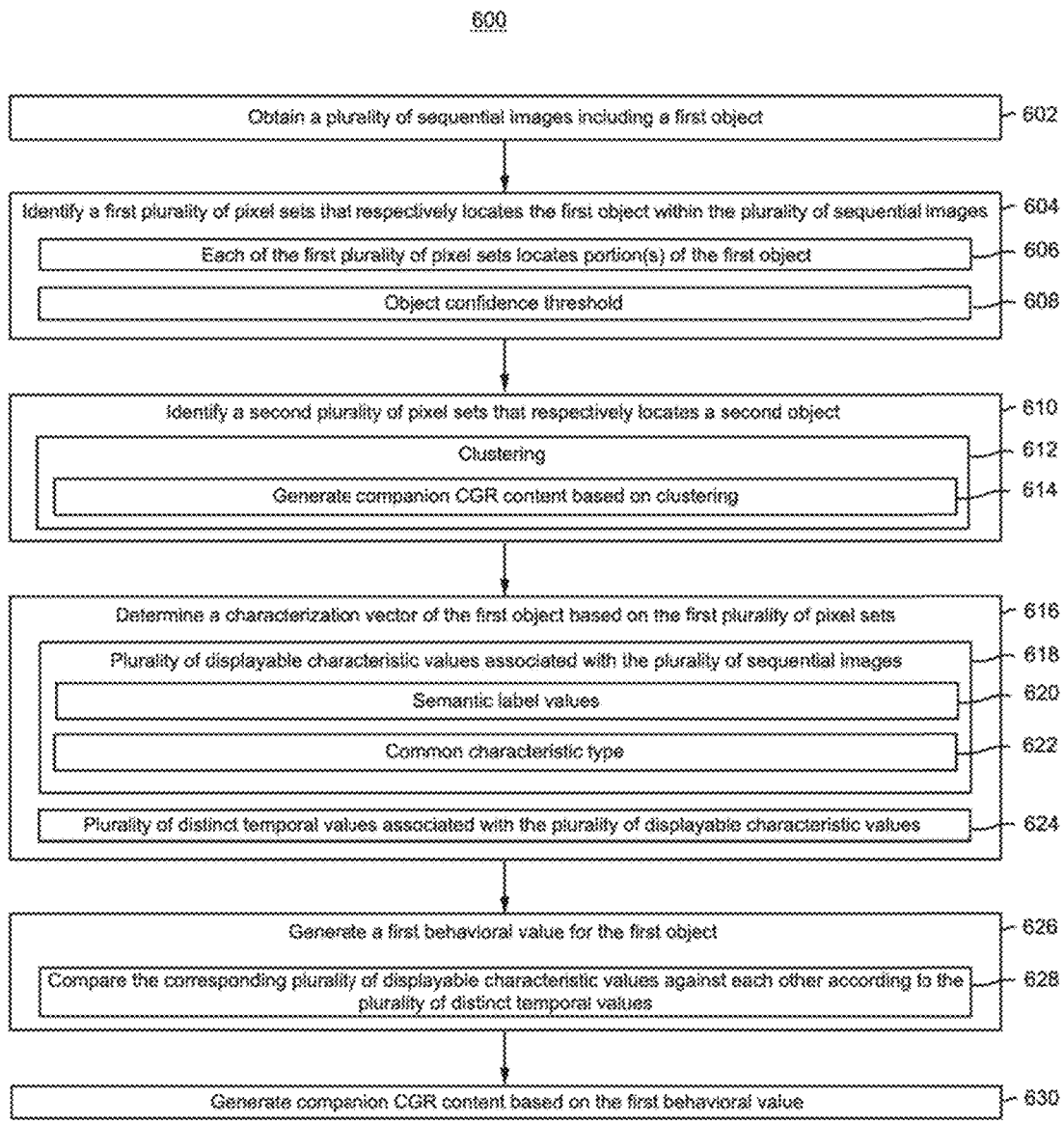
FIG. 6 is a flow diagram of a method of assessing temporal changes to an object across a plurality of sequential images in accordance with some implementations.

FIG. 6 is a flow diagram of a method 600 of assessing temporal changes to an object across a plurality of sequential images in accordance with some implementations. In various implementations, the method 600 or portions thereof are performed by an electronic device (e.g., the electronic device 100 in FIG. 1, the electronic device 100 in FIG. 2A-2K, or the electronic device 100 in FIGS. 5A-5G). In various implementations, the method 600 or portions thereof are performed by a head-mountable device (HMD) including an integrated display. In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 602, the method 600 includes obtaining a plurality of sequential images. Each of the plurality of sequential images includes a first object. For example, each of the plurality of sequential images has a temporal relationship with other of the plurality of sequential images. For example, a first image and a second image of the plurality of sequential images are obtained with a threshold amount of time of each other. In some implementations, the plurality of sequential images corresponds to a video stream. In some implementations, the plurality of sequential images corresponds to pass-through image data obtained via an image sensor, such as an image sensor integrated within a HMD. In some implementations, the first object is a CGR object within an environment, such as a virtual table, either in AR or VR. For example, the first object is inanimate (e.g., a couch or table) or is living (e.g., a person or animal).

As represented by block 604, the method 600 includes identifying, within the plurality of sequential images, a first plurality of pixel sets respectively associated with the plurality of sequential images. Each of the first plurality of pixel sets locates the first object within a corresponding one of the plurality of sequential images on a pixel-by-pixel basis. As one example, with reference to FIG. 2B, the electronic device 100 identifies a pixel set that locates the tail 202a, another pixel set that locates the body 202b, etc. For example, each of the first plurality of pixel sets indicates which pixels of a particular one of the plurality of sequential images correspond to the first object. As another example, each of the first plurality of pixel sets corresponds to a pixel map. As yet another example, with respect to a first one of the plurality of sequential images, a first one of the first plurality of pixel sets indicates the location of the first object within the first one of the plurality of sequential images. In some implementations, some or all of the first plurality of pixel sets are determined via instance segmentation. As represented by block 606, in some implementations, each of the first plurality of pixel sets locates one or more portions of the first object on a pixel-by-pixel basis. As represented by block 608, in some implementations, identifying the first plurality of pixel sets includes identifying, within each of the plurality of sequential images, a respective region including the first object in accordance with a determination that the respective region satisfies an object confidence threshold for the first object.

As represented by block 610, in some implementations, the method 600 includes identifying and behaviorally characterizing multiple objects within the plurality of sequential images. To that end, the method 600 includes identifying, within the plurality of sequential images, a second plurality of pixel sets respectively associated with the plurality of sequential images. Each of the second plurality of pixel sets locates a second object within a corresponding one of the plurality of sequential images on a pixel-by-pixel basis. Further to that end, the method 600 includes extracting, from the plurality of sequential images, additional corresponding plurality of displayable characteristic values based on the second plurality of pixel sets and adding, to the characterization vector, the additional displayable characteristic values. Further to that end, the method 600 includes generating a second behavioral value for the second object based on a function of the additional corresponding plurality of displayable characteristic values and the plurality of distinct temporal values.

As represented by block 612, in some implementations, the method 600 includes clustering (e.g., associating) with respect to the characterized objects. To that end, the method 600 includes determining a difference between the first and second behavioral values. Further to that end, the method 600 includes: in accordance with a determination that the difference satisfies one or more criteria, associating the first object with the second object; and in accordance with a determination that the difference does not satisfy the one or more criteria, foregoing associating the first object with the second object. In some implementations, the one or more criteria include a similarity criterion, such as a worm (first object) moving similarly to a snake (second object). As another example, first and second lightbulbs are flashing at similar rates. As yet another example, two fans in a stadium are both doing the wave. In some implementations, the one or more criteria include a complementary criterion. For example, ocean waves are high and Joe's hair is flowing, both suggesting the presence of strong winds. In some implementations, the one or more criteria include a causality criterion. For example, a bowling ball rolling near a bowling pin and the bowling pin falling down, indicating that the rolling bowling ball caused the pin to fall down.

As represented by block 614, in some implementations, the method 600 includes, in accordance with the determination that the difference satisfies the one or more criteria, generating a computer-generated reality (CGR) object having a third behavioral value that is based on a function of the first and second behavioral values. For example, an electronic device generates an umbrella and displays the umbrella above a person after determining that the person's facial expression changed from happy to sad coincident with the start of rainfall.

As represented by block 616, the method 600 includes determining a characterization vector of the first object by extracting, from the plurality of sequential images, a corresponding plurality of displayable characteristic values based on the first plurality of pixel sets. As represented by block 618, each of the plurality of displayable characteristic values is associated with a corresponding one of the first plurality of pixel sets and a corresponding one of the plurality of sequential images. As one example, the characterization vectors corresponds to one of the characterization vector 210 in FIG. 2C, the characterization vector 300 in FIG. 3, or one of the plurality of characterization vectors 400-1, . . . , 400-W in FIG. 4. For example, each of the corresponding plurality of displayable characteristic values is a based on a function of one or more label values (e.g., sub-values), such as an instance object label value and/or a semantic object label value. As another example, a displayable characteristic value corresponds to an inherent feature of an inanimate first object, such as a decay level of a piece of wood or a corrosion level of a piece of metal. As another example, the displayable characteristic value corresponds to a color (e.g., hue, contrast, brightness) of the first object. As yet another example, the displayable characteristic value corresponds to a material feature of the first object (e.g., flexible versus rigid). As yet another example, the displayable characteristic value corresponds to a shape or form of the first object (e.g., solid ice cream versus melted ice cream). As yet another example, the displayable characteristic value corresponds to amount of deformation of the first object (e.g., a tennis ball hit by a racket deforms then expands back to full size).

As represented by block 620, in some implementations, a portion of the corresponding plurality of displayable characteristic values correspond to a plurality of semantic label values, and generating the first behavioral value for the first object includes comparing the plurality of semantic label values against each other according to the plurality of distinct temporal values. For example, the method 600 includes generating the plurality of semantic label values using a semantic segmentation classifier, such as implemented via a neural network. Each of the plurality of semantic label values corresponds to an understanding of the corresponding pixel. As one example, with reference to FIGS. 2B and 2C, the fourth semantic label value 274 is "White" because the tail 202a is white in color.

As represented by block 622, in some implementations, the corresponding plurality of displayable characteristic values are of a common characteristic type. For example, the first object is living (e.g., moves on its own, such as an animal or person), and the common characteristic type relates to movement of the first object.

As represented by block 624, the characterization vector also includes a plurality of distinct temporal values respectively associated with the corresponding plurality of displayable characteristic values. As an example, each of the plurality of distinct temporal values temporal value indicates when a corresponding one of the plurality of sequential images is obtained. As yet another example, each of the plurality of distinct temporal values indicates when a corresponding one of the plurality of sequential images is created (e.g., captured), such as via a plurality of timestamps.

As represented by block 626, the method 600 includes generating a first behavioral value for the first object based on a function of the corresponding plurality of displayable characteristic values and the plurality of distinct temporal values. For example, the first behavioral value corresponds to one or more of a change in position, velocity, amount of the first object (e.g., evaporation of water or rainfall), chemical state (e.g., solid, liquid, or gas), color, material, shape, structure, deformation, level of decay/corrosion, and/or the like of the first object.

As represented by block 628, in some implementations, generating the first behavioral value for the first object includes comparing the corresponding plurality of displayable characteristic values against each other according to the plurality of distinct temporal values. In some implementations, comparing the plurality of displayable characteristic values against each other is performed in a sequential order based on the plurality of distinct temporal values. For example, the method 600 includes comparing a first one of the corresponding plurality of displayable characteristic values associated with a temporal value of "1" (e.g., first sequential image) against a second one of the corresponding plurality of displayable characteristic values associated with a temporal value of "2" (e.g., second sequential image).

As represented by block 630, in some implementations, the method 600 includes generating a computer-generated reality (CGR) object based on the first behavioral value. For example, when the first behavioral value indicates the first object moving back and forth, the CGR object corresponds to an indicator indicating the presence of wind. As another example, the CGR object corresponds to an objective-effectuator, such as the dog objective-effectuator 522a illustrated in FIG. 5E that the electronic device 100 recommends based on the baseball object 514. In some implementations, the method 600 includes inserting the CGR object into one of the plurality of sequential images. For example, when the first behavioral value indicates the presence of wind, the CGR object is a blade of grass that sways back and forth. As another example, when the first behavioral value indicates an animal moving under a tree to get shade from the Sun, the CGR object is another animal instantiated under the tree.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be openended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at an electronic device including one or more processors, a non-transitory memory, and a display:
   obtaining a plurality of sequential images, wherein each of the plurality of sequential images includes a first object;
   identifying, within the plurality of sequential images, a first plurality of pixel sets respectively associated with the plurality of sequential images, wherein each of the first plurality of pixel sets locates the first object within a corresponding one of the plurality of sequential images on a pixel-by-pixel basis;
   determining a characterization vector of the first object by extracting, from the plurality of sequential images, a corresponding plurality of displayable characteristic values based on the first plurality of pixel sets, wherein each of the plurality of displayable characteristic values is associated with a corresponding one of the first plurality of pixel sets and a corresponding one of the plurality of sequential images, and wherein the characterization vector also includes a plurality of distinct temporal values respectively associated with the corresponding plurality of displayable characteristic values;
   generating a first behavioral value for the first object based on a function of the corresponding plurality of displayable characteristic values and the plurality of distinct temporal values;
   displaying, on the display, a manipulatable computer-generated object based on the first behavioral value;
   while displaying the manipulatable computer-generated object on the display, receiving an input that is directed to within the manipulatable computer-generated object; and
   manipulating the manipulatable computer-generated object on the display based on the input.

2. The method of claim 1, wherein each of the first plurality of pixel sets locates one or more portions of the first object on a pixel-by-pixel basis.

3. The method of claim 1, wherein a portion of the corresponding plurality of displayable characteristic values correspond to a plurality of semantic label values, and wherein generating the first behavioral value for the first object includes comparing the plurality of semantic label values against each other according to the plurality of distinct temporal values.

4. The method of claim 1, wherein the electronic device includes an image sensor, and wherein the plurality of sequential images is obtained from the image sensor.

5. The method of claim 4, wherein the electronic device corresponds to a head-mountable device (HMD) that includes the image sensor.

6. The method of claim 1, wherein identifying the first plurality of pixel sets includes identifying, within each of the plurality of sequential images, a respective region including the first object in accordance with a determination that the respective region satisfies an object confidence threshold for the first object.

7. The method of claim 1, wherein generating the first behavioral value for the first object based on the function includes comparing the corresponding plurality of displayable characteristic values against each other according to the plurality of distinct temporal values.

8. The method of claim 1, further comprising:
   identifying, within the plurality of sequential images, a second plurality of pixel sets respectively associated with the plurality of sequential images, wherein each of the second plurality of pixel sets locates a second object within a corresponding one of the plurality of sequential images on a pixel-by-pixel basis;
   extracting, from the plurality of sequential images, additional corresponding plurality of displayable characteristic values based on the second plurality of pixel sets;
   adding, to the characterization vector, the additional displayable characteristic values; and
   generating a second behavioral value for the second object based on a function of the additional corresponding plurality of displayable characteristic values and the plurality of distinct temporal values.

9. The method of claim 8, further comprising:
   determining a difference between the first and second behavioral values;
   in accordance with a determination that the difference satisfies one or more criteria, associating the first object with the second object; and
   in accordance with a determination that the difference does not satisfy the one or more criteria, foregoing associating the first object with the second object.

10. The method of claim 9, further comprising, in accordance with the determination that the difference satisfies the one or more criteria, generating a computer-generated reality (CGR) object having a third behavioral value that is based on a function of the first and second behavioral values.

11. The method of claim 1, wherein the manipulatable computer-generated object corresponds to an objective-effectuator, and wherein the objective-effectuator performs one or more actions.

12. The method of claim 1, wherein manipulating the manipulatable computer-generated object on the display includes moving the manipulatable computer-generated object from a first position on the display to a second position on the display.

13. An electronic device comprising:
one or more processors;
a non-transitory memory;
a display; and
one or more programs, wherein the one or more programs are stored in the non-transitory memory and configured to be executed by the one or more processors, the one or more programs including instructions for performing operations comprising:
obtaining a plurality of sequential images, wherein each of the plurality of sequential images includes a first object;
identifying, within the plurality of sequential images, a first plurality of pixel sets respectively associated with the plurality of sequential images, wherein each of the first plurality of pixel sets locates the first object within a corresponding one of the plurality of sequential images on a pixel-by-pixel basis;
determining a characterization vector of the first object by extracting, from the plurality of sequential images, a corresponding plurality of displayable characteristic values based on the first plurality of pixel sets, wherein each of the plurality of displayable characteristic values is associated with a corresponding one of the first plurality of pixel sets and a corresponding one of the plurality of sequential images, and wherein the characterization vector also includes a plurality of distinct temporal values respectively associated with the corresponding plurality of displayable characteristic values;
generating a first behavioral value for the first object based on a function of the corresponding plurality of displayable characteristic values and the plurality of distinct temporal values;
displaying, on the display, a manipulatable computer-generated object based on the first behavioral value;
while displaying the manipulatable computer-generated object on the display, receiving an input that is directed to within the manipulatable computer-generated object; and
manipulating the manipulatable computer-generated object on the display based on the input.

14. The electronic device of claim 13, wherein each of the first plurality of pixel sets locates one or more portions of the first object on a pixel-by-pixel basis.

15. The electronic device of claim 13, wherein a portion of the corresponding plurality of displayable characteristic values correspond to a plurality of semantic label values, and wherein generating the first behavioral value for the first object includes comparing the plurality of semantic label values against each other according to the plurality of distinct temporal values.

16. The electronic device of claim 13, wherein identifying the first plurality of pixel sets includes identifying, within each of the plurality of sequential images, a respective region including the first object in accordance with a determination that the respective region satisfies an object confidence threshold for the first object.

17. The electronic device of claim 13, wherein the one or more programs include instructions for performing operations comprising:
identifying, within the plurality of sequential images, a second plurality of pixel sets respectively associated with the plurality of sequential images, wherein each of the second plurality of pixel sets locates a second object within a corresponding one of the plurality of sequential images on a pixel-by-pixel basis;
extracting, from the plurality of sequential images, additional corresponding plurality of displayable characteristic values based on the second plurality of pixel sets;
adding, to the characterization vector, the additional displayable characteristic values; and
generating a second behavioral value for the second object based on a function of the additional corresponding plurality of displayable characteristic values and the plurality of distinct temporal values.

18. The electronic device of claim 17, wherein the one or more programs include instructions for performing operations comprising:
determining a difference between the first and second behavioral values;
in accordance with a determination that the difference satisfies one or more criteria, associating the first object with the second object; and
in accordance with a determination that the difference does not satisfy the one or more criteria, foregoing associating the first object with the second object.

19. The electronic device of claim 18, wherein the one or more programs include instructions for performing operations comprising, in accordance with the determination that the difference satisfies the one or more criteria, generating a computer-generated reality (CGR) object having a third behavioral value that is based on a function of the first and second behavioral values.

20. A non-transitory computer readable storage medium storing one or more programs, the one or more programs comprising instructions, which, when executed by an electronic device including a display, cause the electronic device to:
obtain a plurality of sequential images, wherein each of the plurality of sequential images includes a first object;
identify, within the plurality of sequential images, a first plurality of pixel sets respectively associated with the plurality of sequential images, wherein each of the first plurality of pixel sets locates the first object within a corresponding one of the plurality of sequential images on a pixel-by-pixel basis;
determine a characterization vector of the first object by extracting, from the plurality of sequential images, a corresponding plurality of displayable characteristic values based on the first plurality of pixel sets, wherein each of the plurality of displayable characteristic values is associated with a corresponding one of the first plurality of pixel sets and a corresponding one of the plurality of sequential images, and wherein the characterization vector also includes a plurality of distinct temporal values respectively associated with the corresponding plurality of displayable characteristic values;
generate a first behavioral value for the first object based on a function of the corresponding plurality of displayable characteristic values and the plurality of distinct temporal values;

display, on the display, a manipulatable computer-generated object based on the first behavioral value;
while displaying the manipulatable computer-generated object on the display, receive an input that is directed to within the manipulatable computer-generated object and
manipulate the manipulatable computer-generated object on the display based on the input.

* * * * *